(12) United States Patent
Kato et al.

(10) Patent No.: US 8,442,926 B2
(45) Date of Patent: May 14, 2013

(54) INFORMATION FILTERING SYSTEM, INFORMATION FILTERING METHOD AND INFORMATION FILTERING PROGRAM

(75) Inventors: Mamoru Kato, Tokyo (JP); Mitsunori Kori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 317 days.

(21) Appl. No.: 12/811,755

(22) PCT Filed: Jan. 8, 2008

(86) PCT No.: PCT/JP2008/050048
§ 371 (c)(1),
(2), (4) Date: Jul. 6, 2010

(87) PCT Pub. No.: WO2009/087757
PCT Pub. Date: Jul. 16, 2009

(65) Prior Publication Data
US 2010/0280981 A1    Nov. 4, 2010

(51) Int. Cl.
G06N 3/08    (2006.01)
(52) U.S. Cl.
USPC .......................................................... 706/20
(58) Field of Classification Search .................. None
See application file for complete search history.

(56) References Cited

U.S. PATENT DOCUMENTS 6,076,082 A * 6/2000 Kindo .............................. 706/12
6,286,012 B1 9/2001 Kindo et al.

(Continued)

FOREIGN PATENT DOCUMENTS

JP    1-188934    7/1989
JP    5-204975    8/1993

(Continued)

OTHER PUBLICATIONS

Szymanski, Zhang, "Recursive Data Mining for Masquerade Detection and Author Identificaiton", Proceedings fo 5th IEEE System, Man and Cybernetics INformation Assurance Workshop, West Point, NY, Jun. 2004, pp. 424-431.*

(Continued)

Primary Examiner — Kakali Chaki
Assistant Examiner — Walter Hanchak
(74) Attorney, Agent, or Firm — Oblon, Spivak, McClelland, Maier & Neustadt, L.L.P.

(57) ABSTRACT

A string matching unit 110 specifies a category of an input document 801 by string matching of the input document 801 and a classifying keyword shown by matching condition information 109. Learning data 209 shows statistic information of each category. A classifying unit 220 specifies the category of the input document 801 based on a correspondence ratio of the input document 801 and the statistic information shown by the learning data 209. A correct answer comparing unit 120 compares the category specified by the string matching unit 110 and a category of correct answer information 803. A learning unit 210 compares the category specified by the classifying unit 220 and the category of the correct answer information 803. An error rate calculating unit 310 calculates a classifying error rate of a string matching filter unit 100 and a learning filter unit 200 based on the comparison result of the correct answer comparing unit 120 and the comparison result of the learning unit 210. A result outputting unit 320 outputs the category specified by the filter having a smaller classifying error rate as a classified result 301 of a classifying target document 804.

20 Claims, 8 Drawing Sheets

U.S. PATENT DOCUMENTS

| | | | |
|---|---|---|---|
| 6,327,583 B1 | 12/2001 | Kindo | |
| 6,647,378 B2 | 11/2003 | Kindo | |
| 6,832,217 B1 | 12/2004 | Kindo et al. | |
| 6,901,392 B1 | 5/2005 | Kindo | |
| 6,948,121 B2 | 9/2005 | Kindo | |
| 7,246,128 B2 * | 7/2007 | Jordahl | 1/1 |
| 2002/0069197 A1 * | 6/2002 | Katayama et al. | 707/7 |
| 2003/0028522 A1 * | 2/2003 | Collins-Thompson et al. | 707/3 |
| 2005/0060643 A1 * | 3/2005 | Glass et al. | 715/501.1 |
| 2006/0184479 A1 * | 8/2006 | Levine | 706/25 |
| 2007/0150426 A1 * | 6/2007 | Asher et al. | 706/20 |

FOREIGN PATENT DOCUMENTS

| | | |
|---|---|---|
| JP | 9-16627 | 1/1997 |
| JP | 9-288683 | 11/1997 |
| JP | 11-45247 | 2/1999 |
| JP | 2000-137731 | 5/2000 |
| JP | 2000-331013 | 11/2000 |
| JP | 2001-229164 | 8/2001 |
| JP | 2002-7433 | 1/2002 |
| JP | 2003-67304 | 3/2003 |
| JP | 2005-72672 | 3/2005 |
| KR | 10-0793378 | 1/2008 |

OTHER PUBLICATIONS

Chinese Office Action issued Mar. 7, 2012 in Patent Applicatin No. 200880124282.9 with Partial English Translation.

Office Action issued Jun. 12, 2012 in Japanese Patent Application No. 2009-548827 (with Partial English translation).

Korean Office Action issued Jun. 20, 2011, in Patent Application No. 2010-7014651 (with partial English-language translation).

International Search Report issued Mar. 4, 2008 in PCT/JP2008/050048.

Junichiro Toriwaki, et al., Medical Image Processing (I), Analysis and Recognition, Corona Publishing Co., Ltd., Jul. 20, 2005, pp. 77-88 (with partial English translation).

Thomas R. Lynam, et al., "On-line Spam Filter Fusion", SIGIR, Aug. 6-11, 2006, 8 pages.

* cited by examiner

Fig. 5

109: MATCHING CONDITION INFORMATION
(STATE TRANSITION TABLE)

| STATE \ INPUT | a | b | c |
|---|---|---|---|
| 0 | 1 | 0 | 0 |
| 1 | 1 | 2 | 0 |
| 2 | 1 | 0 | 3 |
| 3 | 1 | 0 | 0 |

INFORMATION FILTERING SYSTEM, INFORMATION FILTERING METHOD AND INFORMATION FILTERING PROGRAM

TECHNICAL FIELD

The present invention relates to, for example, an information filtering system, an information filtering method, and an information filtering program for classifying input documents.

BACKGROUND ART

Information filtering means information processing for automatically selecting information according to whether the information matches a request prescribed by the user (filtering condition) or not. In the information filtering, in order to improve filtering precision, it is generally done to use automatic document classifying technique by mechanical learning, and to add or change filtering condition by feedback specified by the user (Patent Document 1). This is called as a learning filter.

Further, as a method to improve filtering precision, there is another filtering method which combines plural learning filters having different filtering conditions (Patent Document 2). In this method, outputs from the plural filters (degree of conformance to the filtering condition) are composed based on the specification by the user to make the final output.

Patent Document 1: JP9-288683A
Patent Document 2: JP2001-229164A

DISCLOSURE OF THE INVENTION

Problems to be Solved by the Invention

However, in the learning filter such as the above, there is a problem that the filtering precision is low at the initial state where the learning amount is small. In order to solve the problem, for example, sufficient amount of learning sample data should be prepared before operating the system, and the system should repeat learning until sufficient precision can be obtained. However, in order to generate learning sample data, it is necessary to identify whether it matches the request (filtering condition) or not manually. Therefore, it is difficult to prepare sufficient amount of learning sample data in an actual system. Further, when the user request or the contents of the filtering target data largely changes in a short time because of environment change (for example, change of organization in the company) etc., the filtering precision is largely degraded temporarily. Then, if the learning filter is made to follow the change by feedback specified by the user, there is a problem that it takes time to return the filtering precision to the original level.

The present invention is done, for example, in order to solve the above problems, and aims to provide an information filtering system which can secure the filtering precision with a certain level even if it is at the initial state when the learning amount is small or if the user request or the contents of the target data largely changes.

Means to Solve the Problems

According to the present invention, an information filtering system includes: a first filter unit inputting document data belonging to at least any kind among a plurality of kinds from an input equipment, carrying out a predetermined classifying process to specify a kind to which the document data inputted belongs using a CPU (Central Processing Unit), and specifying the kind to which the document data inputted belongs as first classified information; a second filter unit inputting the document data from an input equipment, carrying out a predetermined classifying process being different from the classifying process of the first filter unit using a CPU, specifying a kind to which the document data inputted belongs as second classified information; a first correct answer comparing unit comparing the first classified information of a plurality of pieces of learning document data specified by the first filter unit with treating each of the plurality of pieces of learning document data which belongs to a kind previously specified as the document data and correct answer information of the plurality of pieces of learning document data which belongs to the kind previously specified using a CPU, generating first learning result information of the plurality of pieces of learning document data showing whether the first classified information matches the correct answer information or not based on comparison result, and storing the first learning result information generated of the plurality of pieces of learning document data in a memory equipment; a second correct answer comparing unit comparing the second classified information of the plurality of pieces of learning document data specified by the second filter unit with treating each of the plurality of pieces of learning document data as the document data and the correct answer information of the plurality of pieces of learning document data using a CPU, generating second learning result information of the plurality of pieces of learning document data showing whether the second classified information matches the correct answer information based on comparison result, and storing the second learning result information generated of the plurality of pieces of learning document data in a memory equipment; an error rate calculating unit calculating a first error rate showing a rate that the first classified information does not match the correct answer information based on the first learning result information of the plurality of pieces of learning document data generated by the first correct answer comparing unit using a CPU, and as well calculating a second error rate showing a rate that the second classified information does not match the correct answer information based on the second learning result information of the plurality of pieces of learning document data generated by the second correct answer comparing unit using a CPU; and a result outputting unit specifying a kind to which the classifying target document data belongs using a CPU based on the first classified information specified by the first filter unit with treating classifying target document data which is a target to be classified to a specific kind as the document data, the second classified information specified by the second filter unit with treating the classifying target document data as the document data, the first error rate calculated by the error rate calculating unit, and the second error rate calculated by the error rate calculating unit, and outputting the kind specified to an output equipment as a classified result.

The first filter unit is a learning filter unit including: a learning unit inputting a plurality of sets of the learning document data and the correct answer information from an input equipment, carrying out a statistic process to generate statistic information being common to each learning document data belonging to each kind as learning data based on the plurality of sets using a CPU, and storing the learning data generated by the statistic process in a memory equipment; and a learning classifying unit inputting the classifying target document data from an input equipment, calculating a ratio of correspondence of the classifying target document data to the statistic information shown by the learning data generated by the learning unit for each kind as classification probability using a CPU, and specifying a kind to which the classifying target document data belongs based on the classification probability for each kind.

The learning unit carries out the statistic process using either one of a Bayesian theory, an SVM (Support Vector Machine), and a neural network model.

The second filter unit is a string matching filter unit inputting the document data from an input equipment, inputting matching condition information from a memory equipment which previously stores a classifying keyword belonging to each kind as the matching condition information, carrying out a string matching process using a CPU to discriminate whether the classifying keyword of each kind shown by the matching condition information is included in the document data or not, and specifying the kind, to which the classifying keyword which is discriminated to be included in the document data by the string matching process belongs, as the kind to which the document data belongs.

The string matching filter unit carries out the string matching process using a deterministic finite automaton.

The string matching filter unit carries out the string matching process using a state transition table of the deterministic finite automaton showing the classifying keyword as the matching condition information.

The string matching filter unit carries out the string matching process using a nondeterministic finite automaton.

The result outputting unit, when the first error rate is smaller than the second error rate, outputs the first classified information as the classified result, and when the second error rate is smaller than the first error rate, outputs the second classified information as the classified result.

The result outputting unit expresses the first classified information and the second classified information with predetermined numeral values, weights the first classified information according to the first error rate, as well weights the second classified information according to the second error rate, calculates an average value of the first classified information weighted and the second classified information weighted as a weighted average value, compares the weighted average value calculated and a predetermined threshold value, and outputs the classified result based on comparison result.

The matching condition information shows a specific classifying keyword among the plurality of classifying keywords as a specific keyword, and the result outputting unit outputs a kind to which the specific keyword belongs as the classified result of the classifying target document data which is discriminated to include the specific keyword by the string matching filter unit.

The error rate calculating unit calculates the first error rate based on the first learning result information generated within a predetermined period, and as well calculates the second error rate based on the second learning result information generated within the predetermined period.

The learning filter unit includes a first learning filter unit and a second learning filter unit, the first learning filter unit and the second learning filter unit respectively include the learning unit and the learning classifying unit, the learning unit of the first learning filter unit and the learning unit of the second learning filter unit respectively carry out different statistic processes, and the first classified information shows first learning classified information showing the kind specified by the learning classifying unit of the first learning filter unit and second learning classified information showing the kind specified by the learning classifying unit of the second learning filter unit.

The result outputting unit, when the first classified information is outputted as the classified result, obtains a logical sum of the kind shown by the first learning classified information and the kind shown by the second learning classified information, and outputs the kind shown by the logical sum obtained as the classified result.

The result outputting unit, when the first classified information is outputted as the classified result, outputs the classified result based on the classification probability of the kind shown by the first learning classified information and the classification probability of the kind shown by the second learning classified information.

The result outputting unit, when the first classified information is outputted as the classified result, weights the first learning classified information according to the first error rate of the first learning classified information, and as well weights the first learning classified information according to the first error rate of the first learning classified information, calculates an average value of the first learning classified information weighted and the second learning classified information weighted as a weighted average value, compares the weighted average value calculated and a predetermined threshold value, and outputs the classified result based on comparison result.

The learning filter unit includes a plurality of sets of the learning unit and the learning classifying unit, a plurality of the learning units respectively carry out the statistic processes, the first classified information shows the kind specified by the learning classifying unit of the respective set, and the result outputting unit, when the first classified information is outputted as the classified result, outputs the kind specified by the largest number of sets as the classified result.

According to the present invention, an information filtering method includes: by a first filter unit, performing a first filter process of inputting document data belonging to at least any kind among a plurality of kinds from an input equipment, carrying out a predetermined classifying process to specify a kind to which the document data inputted belongs using a CPU (Central Processing Unit), and specifying the kind to which the document data inputted belongs as first classified information; by a second filter unit, performing a second filtering process of inputting the document data from the input equipment, carrying out a predetermined classifying process being different from the classifying process of the first filter unit using a CPU, specifying the kind to which the document data inputted belongs as second classified information; by a first correct answer comparing unit, performing a first correct answer comparing process of treating each of a plurality of pieces of learning document data which belongs to a kind previously specified as the document data, comparing the first classified information of the plurality of pieces of learning document data specified by the first filter unit and correct answer information of the plurality of pieces of learning document data which belongs to the kind previously specified using a CPU, generating first learning result information of the plurality of pieces of learning document data showing whether the first classified information matches the correct answer information or not based on comparison result, and storing the first learning result information generated of the plurality of pieces of learning document data in a memory equipment; by a second correct answer comparing unit, performing a second correct answer comparing process of treating each of the plurality of pieces of learning document data as the document data, comparing the second classified information of the plurality of pieces of learning document data specified by the second filter unit and the correct answer information of the plurality of pieces of learning document data using a CPU, generating second learning result information of the plurality of pieces of learning document data showing whether the second classified information matches the correct answer information based on the comparison result, and storing the second learning result information generated of the plurality of pieces of learning document data in the memory equipment; by an error rate calculating unit, performing an error rate calculating process of calculating a first error rate showing a rate that the first classified information does not match the correct answer information based on the first learning result information of the plurality of pieces of learning document data generated by the first correct answer comparing unit using a CPU, and as well calculating a second error rate showing a rate that the second classified information does not match the correct answer information based on the second learning result information of the plurality of pieces of learning document data generated by the second correct answer comparing unit using a CPU; and by a result outputting unit, performing a result outputting process of treating classifying target document data which is a target to be classified to a specific kind as the document data, specifying the kind to which the classifying target document data belongs using a CPU based on the first classified information specified by the first filter unit, the second classified information specified by the second filter unit, the first error rate calculated by the error rate calculating unit, and the second error rate calculated by the error rate calculating unit, and outputting the kind specified to an output equipment as a classified result.

According to the present invention, an information filtering program has a computer execute the information filtering method.

Effect of the Invention

According to the present invention, the information filtering system can secure the filtering precision with a certain level by, for example, outputting classified result with the result outputting unit based on the first classified information specified by the first filter unit, the second classified information specified by the second filter unit, and the error rate of each filter unit.

BEST MODE FOR CARRYING OUT THE INVENTION

Embodiment 1

FIG. 1 is a functional configuration diagram showing an information filtering system 900 according to the first embodiment. The functional configuration of the information filtering system 900 according to the first embodiment will be explained with reference to FIG. 1.

The information filtering system 900 includes a string matching filter unit 100, a learning filter unit 200, and a result discriminating unit 300.

The string matching filter unit 100 (the second filter unit) includes a string matching unit 110, a correct answer comparing unit 120, and a string matching filter memory unit 190, inputs an input document 801 (a learning document 802, a classifying target document 804) belonging to at least one category among plural classifying categories (classifying kinds) from an input equipment, carries out a string matching process (an example of a predetermined classifying process) on the input document 801 using a CPU, and specifies the category to which the input document 801 belongs as matched information 101 (the second classified information).

The string matching filter memory unit 190 is a memory equipment for storing various kinds of information used by the string matching filter unit 100. For example, the string matching filter memory unit 190 previously stores matching condition information 109 showing a classifying keyword 108 belonging to each category.

The string matching unit 110 inputs the matching condition information 109 from the string matching filter memory unit 190, and carries out the string matching process for discriminating whether the classifying keyword 108 of each category shown by the matching condition information 109 is included in the input document 801 or not using the CPU. Then, the string matching unit 110 deems the category, to which the classifying keyword 108 belongs and which is discriminated to be included in the input document 801, to be the matched information 101 of the input document 801. For example, the string matching unit 110 carries out the string matching process using a deterministic finite automaton or a nondeterministic finite automaton. When the string matching process is carried out by the deterministic finite automaton, a state transition table of the deterministic finite automaton showing the classifying keyword 108 is previously stored in the string matching filter memory unit 190 as the matching condition information 109. The string matching unit 110 carries out the string matching process using the state transition table which is previously stored in the string matching filter memory unit 190. For example, this state transition table is generated before starting the operation of the information filtering system 900 and stored in the string matching filter memory unit 190.

The correct answer comparing unit 120 (the second correct answer comparing unit) compares, using the CPU, the matched information 101 of the learning document 802 (learning document data) specified by the string matching unit 110 with correct answer information 803 showing a category to which the learning document 802 belongs and which has been previously specified. Next, the correct answer comparing unit 120 generates matching error presence information 102 (the second learning result information) showing whether the matched information 101 matches the correct answer information 803 or not based on the comparison result. Then, the correct answer comparing unit 120 stores the matching error presence information 102 generated in a result discrimination memory unit 390 as learning result information 309. The correct answer comparing unit 120 generates and stores the matching error presence information 102 for each learning document 802 of the plural learning documents 802.

The learning filter unit 200 (the first filter unit) includes a learning unit 210, a classifying unit 220, and a learning filter memory unit 290, inputs the input document 801 from the input equipment, carries out a learning filtering process (an example of a predetermined classifying process which is different from the classifying process by the string matching filter unit 100) using the CPU, and specifies a category to which the input document 801 belongs as classified information 201 (the first classified information).

The learning filter memory unit 290 is a memory equipment for storing various kinds of information used by the learning filter unit 200. For example, the learning filter memory unit 290 stores, for each category, statistic information which is common to each input document 801 belonging to that category as learning data 209.

The learning unit 210 inputs plural sets of the learning document 802 and the correct answer information 803 from the input equipment, carries out the statistic process based on the inputted plural sets using the CPU, and stores learning data 209 generated by the statistic process in the learning filter memory unit 290. For example, the learning unit 210 carries out the statistic process using the Bayesian theory, the SVM (Support Vector Machine) or a neural network model.

The classifying unit 220 (the learning classifying unit) inputs the classifying target document 804 (classifying target document data) which is a target to be classified to a specific category from the input equipment. The classifying unit 220 calculates a ratio of correspondence of the classifying target document 804 to the statistic information shown in the learning data 209 generated by the learning unit 210 using the CPU for each category as a classification probability. Then, the classifying unit 220 specifies a category to which the classifying target document 804 belongs as the classified information 201 based on the classification probability for each category.

Further, the learning unit 210 (the first correct answer comparing unit) compares the classified information 201 of the learning document 802 specified by the classifying unit 220 and the correct answer information 803 using the CPU. Next, the learning unit 210 generates classifying error presence information 202 (the second learning result information) showing whether the classified information 201 matches the correct answer information 803 or not based on the comparison result. Then, the learning unit 210 stores the classifying error presence information 202 as the learning result information 309 in the result discrimination memory unit 390. The learning unit 210 generates and stores the classifying error presence information 202 for each learning document 802 of the plural learning documents 802.

The result discriminating unit 300 includes an error rate calculating unit 310, a result outputting unit 320, and a result discrimination memory unit 390, and outputs the classified result 301 of the classifying target document 804 to the output equipment.

The result discrimination memory unit 390 is a memory equipment for storing various kinds of information used by the result discriminating unit 300. For example, the result discrimination memory unit 390 stores plural pieces of the matching error presence information 102 generated by the correct answer comparing unit 120 of the string matching filter unit 100 and plural pieces of the classifying error presence information 202 generated by the learning unit 210 of the learning filter unit 200 as the learning result information 309. Further, for example, the result discrimination memory unit 390 stores the classifying error rate of the string matching filter unit 100 or the classifying error rate of the learning filter unit 200 as the error rate information 308.

The error rate calculating unit 310 calculates a classifying error rate (the second error rate) of the string matching filter unit 100 showing a rate that the matched information 101 does not match the correct answer information 803 using the CPU based on plural pieces of the matching error presence information 102 generated by the correct answer comparing unit 120 of the string matching filter unit 100. Further, the error rate calculating unit 310 calculates a classifying error rate (the first error rate) of the learning filter unit 200 showing a rate that classified information 201 does not match the correct answer information 803 using the CPU based on plural pieces of the classifying error presence information 202 generated by the learning unit 210 of the learning filter unit 200. The classifying error rate of the string matching filter unit 100 and the classifying error rate of the learning filter unit 200 calculated by the error rate calculating unit 310 are stored in the result discrimination memory unit 390 as the error rate information 308. Further, the error rate calculating unit 310 calculates the classifying error rate of the string matching filter unit 100 and the classifying error rate of the learning filter unit 200 based on the learning result information 309 generated within a predetermined period.

Here, since the classifying error rate is a value obtained by subtracting a classifying correct answer rate from 100%, to calculate the classifying error rate can be replaced with to calculate the classifying correct answer rate. Namely, it is possible to say the error rate calculating unit 310 calculates the classifying correct answer rate.

The result outputting unit 320 specifies a category to which the classifying target document 804 belongs using the CPU based on the matched information 101 specified by the string matching unit 110 of the string matching filter unit 100, the classified information 201 specified by the classifying unit 220 of the learning filter unit 200, and the error rate information 308 calculated by the error rate calculating unit 310. Then, the result outputting unit 320 outputs the specified category to the output equipment as the classified result 301. This operation corresponds to specifying the category of the classifying target document 804 by the result outputting unit 320 based on the matched information 101, the classified information 201, and the classifying correct answer rate for each filter unit.

For example, when the classifying error rate of the string matching filter unit 100 is smaller than the classifying error rate of the learning filter unit 200, the result outputting unit 320 outputs the category shown by the matched information 101 as the classified result 301; and when the classifying error rate of the learning filter unit 200 is smaller than the classifying error rate of the string matching filter unit 100, the result outputting unit 320 outputs the category shown by the classified information 201 as the classified result 301. This operation corresponds to outputting the category shown by the matched information 101 as the classified result 301 when the classifying correct answer rate of the string matching filter unit 100 is larger than the classifying correct answer rate of the learning filter unit 200; and the operation corresponds to outputting the category shown by the classified information 201 as the classified result 301 when the classifying correct answer rate of the learning filter unit 200 is larger than the classifying correct answer rate of the string matching filter unit 100.

Further, for example, the result outputting unit 320 shows the matched information 101 and the classified information 201 by predetermined numeral values; the result outputting unit 320 weights the matched information 101 according to the classifying error rate of the string matching filter unit 100, and as well weights the classified information 201 according to the classifying error rate of the learning filter unit 200. Next, the result outputting unit 320 calculates an average value of the weighted matched information 101 and the weighted classified information 201 as a weighted average value. Then, the result outputting unit 320 compares the calculated weighted average value and a predetermined threshold value, and outputs the classified result 301 based on the comparison result.

Further, for example, a specific keyword (a priority keyword) which should have a priority as the classified result is previously prescribed in the matching condition information 109. Then, when the string matching unit 110 of the string matching filter unit 100 discriminates that the classifying target document 804 includes the priority keyword, the result outputting unit 320 outputs the category to which the priority keyword belongs as the classified result 301 regardless of the size of the classifying error rates of the string matching filter unit 100 and the learning filter unit 200 or the weighted average value, etc.

FIG. 2 shows an example of an outer appearance of the information filtering system 900 according to the first embodiment.

In FIG. 2, the information filtering system 900 is provided with hardware resource such as a system unit 910, a display device 901 including a display screen of a CRT (Cathode Ray Tube) or LCD (liquid crystal), a keyboard 902 (Key Board: K/B), a mouse 903, a FDD 904 (Flexible Disk Drive), a CDD 905 (compact disk drive), a printer device 906, a scanning device 907, etc., which are connected by cables or signal lines.

The system unit 910 is a computer, which is connected to a facsimile machine 932 and a telephone 931 by cables, and further, connected to the Internet 940 through a LAN 942 (local area network), or a gateway 941.

FIG. 3 shows an example of hardware resource of the information filtering system 900 according to the first embodiment.

In FIG. 3, the information filtering system 900 includes a CPU 911 (Central Processing Unit, also called as a central processing device, a processing device, an arithmetic device, a micro-processor, a micro-computer, or a processor) for executing programs. The CPU 911 is connected to a ROM 913, a RAM 914, a communication board 915, a display device 901, a keyboard 902, a mouse 903, a FDD 904, a CDD 905, a printer device 906, a scanning device 907, a magnetic disk drive 920 through a bus 912, and controls these hardware devices. Instead of the magnetic disk drive 920, memory devices such as an optical disk device, and a memory card reading/writing device, etc. can be used.

The RAM 914 is an example of a volatile memory. Storage media of the ROM 913, the FDD 904, the CDD 905, the magnetic disk drive 920 are examples of the nonvolatile memory. These are examples of the memory equipment, the memory device or the memory unit. Further, the memory equipment storing input data is an example of the input equipment, the input device, or the inputting unit; and the memory equipment storing output data is an example of the output equipment, the output device, or the outputting unit. The communication board 915, the keyboard 902, the scanning device 907, the FDD 904, etc. is an example of the input equipment, the input device, or the inputting unit.

Further, the communication board 915, the display device 901, the printer device 906, etc. is an example of the output equipment, the output device, or the outputting unit.

The communication board 915 is connected to the facsimile machine 932, the telephone 931, and LAN 942, etc. The communication board 915 can be connected to not only the LAN 942, but also to a WAN (wide area network) such as the Internet 940, ISDN, etc. If the communication board 915 is connected to the Internet 940 or the WAN such as ISDN, etc., the gateway 941 is unnecessary.

The magnetic disk drive 920 stores an OS 921 (operating system), a window system 922, programs 923, and files 924. A program of the programs 923 is executed by the CPU 911, the OS 921, or the window system 922.

The programs 923 store programs for implementing functions which will be explained as "—unit" in the embodiments. The programs are read and executed by the CPU 911.

The files 924 store result data such as "discrimination result of—", "calculation result of—", or "processed result of—" when the functions of "—unit" are implemented in the embodiments, data received/sent between programs for implementing the function of "—unit", other information, data, signal values, variables, and parameters as each item of "—file" or "—database". The matched information 101, the matching condition information 109, the classified information 201, the learning data 209, the classified result 301, the error rate information 308, the learning result information 309, etc. are examples of electronic data included in the files 924.

"—file" or "—database" is stored in the recording medium such as disks or memories. The information, data, signal values, variables, and parameters stored in the storage media such as disks or memories, etc. are read to a main memory or a cache memory through the reading/writing circuit by the CPU 911, and used for the operation of the CPU such as extraction, search, reference, comparison, operation, calculation, processing, output, printing, displaying, etc. During the operation of the CPU such as extraction, search, reference, comparison, operation, calculation, processing, output, printing, and displaying, information, data, signal values, variables, and parameters are temporarily stored in a main memory, a cache memory, or a buffer memory.

Further, a part of an arrow shown in flowcharts which will be explained in the embodiments mainly shows inputs/outputs of data or signals, and the data or signal values are stored in recording medium such as a memory of the RAM 914, a flexible disk of the FDD 904, a compact disk of the CDD 905, a magnetic disk of the magnetic disk drive 920, and other an optical disk, a mini disk, a DVD (Digital Versatile Disc), etc. Further, data or signal values are transmitted on-line by the bus 912, the signal lines, the cables, and other transmission medium.

Further, in the embodiments, elements explained as "—unit" can be "—circuit", "—device", or "—equipment", and further, can be "—step", "—procedure", or "—process". Namely, elements explained as "—unit" can be implemented by firmware stored in the ROM 913. In another way, they can be implemented only by software, or only by hardware such as elements, devices, boards, wirings, etc., or by a combination with software and hardware, or further, by a combination with firmware. Firmware and software are stored as programs in recording medium such as a magnetic disk, a flexible disk, an optical disk, a compact disk, a mini disk, a DVD, etc. Programs are read by the CPU 911 and executed by the CPU 911. Namely, programs such as the information filtering program are to make the computer function as "—unit". Or the programs are to make the computer implement a procedure or a method of "—unit".

FIG. 4 is a flowchart showing a flow of a learning result generating process in the first embodiment.

A method for generating the learning data 209, the learning result information 309, and the error rate information 308 by the information filtering system 900 will be explained in the following with reference to FIG. 4.

Each unit constituting the information filtering system 900 implements each process which will be explained in the following using the CPU.

<S110: Second Learning Classifying Process>

The string matching unit 110 of the string matching filter unit 100 carries out the string matching on the learning document 802 based on the matching condition information 109 and outputs the matched information 101.

Hereinafter, a detail of the second learning the classifying process (S110) will be explained.

First, the string matching unit 110 inputs the learning document 802 from the input equipment.

The category to which the learning document 802 belongs is previously specified by the user.

Next, the string matching unit 110 inputs the matching condition information 109 from the string matching filter memory unit 190.

The matching condition information 109 is prescribed by the user before operating the system or during the operation of the system, and stored in the string matching filter memory unit 190. To the matching condition information 109, at least one classifying keyword 108 belonging to each category for classifying the input document 801 is set for each category.

The classifying keyword 108 can be fixed words, or can be regular expression. For example, to the matching condition information 109, fixed words of "FOR INTERNAL USE ONLY" or regular expression of "FOR*INTERNAL*USE*ONLY" are set as the classifying keyword 108 belonging to the category of "company information (an example of confidential information)". "*" shows an arbitrary character or an arbitrary character string (successive plural characters, a character set), and "FOR*INTERNAL*USE*ONLY" includes a character set which includes a space between characters such as "FOR_INTERNAL_USE_ONLY" ("_" shows a space). Namely, by the regular expression, plural expressions including slight variation of expression can be expressed as a term having the same meaning using one pattern of expression. The slight variation of expression means the presence or absence of KANAs subsequent to Chinese characters, a prolonged sound note (macron), or the presence or absence of a space. By expressing the classifying keyword 108 using the regular expression, the string matching unit 110 can set not only simple terms but also complex expressions for the matching target.

Further, the user can separate each category into plural groups, and as well the user can refine or stratify the matching condition information 109 by setting the classifying keyword 108 for each group.

For example, in order to detect the confidential information by the information filtering system 900, the user can classify confidential documents into categories such as "personal information", "customer information", "new technology information", etc., sets "name", "address", etc. as groups belonging to the category of "personal information", and sets words (including the regular expression) such as "name", "address", an individual name ("Suzuki", "Satoh", "Tanaka", etc.), a place-name ("Tokyo-to", "Chiyoda-ku", etc.), etc. as the classifying keyword 108 belonging to the group of "name". In this case, each classifying keyword 108 showing "name", "address", an individual name, or a place-name belongs to the category of "personal information" of the confidential document.

Further, for example, the user can classify each category into groups for each grade showing a level of confidentiality.

Further, for example, the user can classify each category into groups by a time unit (a year unit, a month unit, etc.). A group having the classifying keyword 108 of a division name (including an abbreviated name) at the time of establishing the company or a group having the classifying keyword 108 of a division name which has been changed by reformation of the organization on the day of ZZ of the month of YY in the year of XXXX is an example of the group classified by a time unit.

The user can set the matching condition information 109 by adding, changing, and deleting for each classifying keyword 108, and the user can set the matching condition information 109 for each group or each category.

The matching condition information 109 shows "at least one category", "at least one group belonging to each category" and "at least one classifying keyword 108 belonging to each group" prescribed by the user. Further, each group is identified by an ID (Identifier).

The matching condition information 109 can be a text file in which categories, groups and classifying keywords 108 are listed, or a table file showing a state transition table of the DFA (Deterministic Finite Automaton).

In a method known as the DFA, matching condition showing the regular expression of each classifying keyword 108 is compiled, a state transition table showing the matching condition is generated, and the string matching is carried out based on the state transition table.

The matching condition is compiled and the state transition table is stored previously as the matching condition information 109, and thereby compiling time at the system start becomes unnecessary, and the system start process can be accelerated.

In the state transition table of the DFA, the alignment order of characters is set as "state (for example, state 0, state 1, . . . )", and "the current state" and "the next character" are set for a column item and a row item of the table, and a combination of "the current state" and "the next character" is shown as "the next state". The string matching unit 110 inputs characters sequentially from the input document 801, repeats the state transition from "the current state" to "the next state" according to the inputted character, and when "the current state" becomes the final state (the state showing the alignment order from the initial character to the final character of the classifying keyword 108), it is discriminated that the classifying keyword 108 is included in the input document 801.

FIG. 5 shows an example of the state transition table of the DFA in the first embodiment.

For example, the classifying keyword 108 of "abc" is shown by the state transition table of FIG. 5. However, FIG. 5 shows the state transition for only three characters of "a", "b", and "c", and omits the state transition for other characters (for example, "d", "e", . . . and "z").

In FIG. 5, "state 0", "state 1", "state 2", and "state 3" shown in the first column represent the current states, "a", "b", and "c" shown in the first row represent new inputted characters (the next characters), values of the second column of the second row to the fourth column of the fifth row represent the next states.

"State 0" represents the state in which the initial character "a" of the classifying keyword 108 is not inputted.

"State 1" represents the state in which the initial character "a" of the classifying keyword 108 is inputted.

"State 2" represents the state in which "b" is inputted subsequently to "a".

"State 3" represents the final state in which "c" is inputted subsequently to "ab".

When the current state is "state 0", the state moves to "state 1" if the next character is "a", and if the next character is "b" or "c", the state remains "state 0".

When the current state is "state 1", the state remains "state 1" if the next character is "a", the state moves to "state 2" if the next character is "b", and the state returns to "state 0" if the next character is "c".

When the current state is "state 2", the state returns to "state 1" if the next character is "a", the state returns to "state 0" if the next character is "b", the state moves to "state 3" which is the final state if the next character is "c".

Namely, only when the alignment order of characters is like "a to b to c", the state becomes the final state showing the classifying keyword 108 of "abc".

After inputting the matching condition information 109 from the string matching filter memory unit 190, the string matching unit 110 carries out the string matching process to discriminate whether each classifying keyword 108 prescribed in the matching condition information 109 is included in the learning document 802 or not.

For example, "strstr" function of C language, tools of "grep", "sed", "perl", etc., and other regular expression libraries are used in the string matching process.

The string matching process can be a search process of the learning document 802 using each classifying keyword 108 prescribed in the matching condition information 109 as a search keyword, or a comparing process of each term included in the learning document 802 and each classifying keyword 108 prescribed in the matching condition information 109. For example, each term included in the learning document 802 is extracted by the morphological analysis.

Then, the string matching unit 110 generates the matched information 101 based on the result of the string matching process and outputs the generated matched information 101 to the correct answer comparing unit 120.

The matched information 101 shows the learning document 802 (an example of the input document 801) matches the matching condition (the classifying keyword 108) of which category, namely, the matched information 101 shows which category the learning document 802 belongs to. The category shown by the matched information 101 (the category of which the matching condition is matched with the learning document 802) shows the category to which the learning document 802 belongs specified by the string matching unit 110.

For example, in the string matching process, if it is discriminated that at least one classifying keyword 108 (for example, "name") is included in the learning document 802 among the plural classifying keywords 108 belonging to a certain category (for example, "personal information"), the string matching unit 110 discriminates that the learning document 802 belongs to that category ("personal information"). Then, the string matching unit 110 sets the information that the learning document 802 matches the matching condition of the category ("personal information") in the matched information 101.

Further, for example, in the string matching process, the string matching unit 110 calculates the sum of the number of appearances (the number of hits) of the classifying keyword 108 in the learning document 802 for each category. Then, the string matching unit 110 discriminates that the learning document 802 belongs to the category of which the sum of the number of appearances of the classifying keyword 108 is equal to or greater than a predetermined threshold value, and the string matching unit 110 sets the information that the learning document 802 matches the matching condition of the category in the matched information 101. For example, it is assumed that the threshold value is "10". At this time, the string matching unit 110 discriminates whether the sum of appearances of each classifying keyword 108 belonging to "personal information" such as "name", "address", individual names, place-names, etc. included in the learning document 802 is equal to or greater than 10 or not. Then, if it is discriminated that equal to or greater than 10 of each classifying keyword 108 belonging to "personal information" are included, the string matching unit 110 discriminates that the learning document 802 belongs to "personal information".

The matched information 101 can show "matched" or "mismatched" for all categories, or can show "matched" or "mismatched" for not by a unit of category but by a unit of group.

Next, the second correct answer comparing process (S120) shown in FIG. 4 will be explained.

<S120: Second Correct Answer Comparing Process>

After S110, the correct answer comparing unit 120 of the string matching filter unit 100 compares the matched information 101 and the correct answer information 803, and accumulates matching error presence information 102 as the learning result information 309.

Hereinafter, a detail of the second correct answer comparing process (S120) will be explained.

First, the correct answer comparing unit 120 inputs the matched information 101 outputted by the string matching unit 110 at S110, and further, inputs the correct answer information 803 from the input equipment.

Next, the correct answer comparing unit 120 compares the matched information 101 and the correct answer information 803, and discriminates whether the matched information 101 matches the correct answer information 803 or not.

The correct answer information 803 constitutes a set with the learning document 802, and the category to which the learning document 802 belongs specified previously by the user is prescribed. The number of categories prescribed in the correct answer information 803 can be one or plural for one learning document 802.

For example, it is assumed that one category is prescribed in the correct answer information 803. At this time, if the category prescribed in the correct answer information 803 is shown as "matched" in the matched information 101, the correct answer comparing unit 120 discriminates that the matched information 101 matches the correct answer information 803.

Further, for example, it is assumed that plural categories are prescribed in the correct answer information 803. At this time, if at least one category among plural categories prescribed in the correct answer information 803 is shown as "matched" in the matched information 101, the correct answer comparing unit 120 discriminates that the matched information 101 matches the correct answer information 803. Further, the correct answer comparing unit 120 can discriminate that the matched information 101 matches the correct answer information 803 only when all of plural categories prescribed in the correct answer information 803 are shown as "matched" in the matched information 101. Further, the correct answer comparing unit 120 can discriminate whether the matched information 101 matches the correct answer information 803 or not for each category.

Then, the correct answer comparing unit 120 accumulates the matching error presence information 102 showing the discriminated result in the result discrimination memory unit 390 as the learning result information 309.

The matching error presence information 102 shows the match of the matched information 101 and the correct answer information 803 as "correct answer", and shows the mismatch of the matched information 101 and the correct answer information 803 as "error".

Next, the first learning classifying process (S130) shown in FIG. 4 will be explained.

<S130: First Learning Classifying Process>

The classifying unit 220 of the learning filter unit 200 classifies the learning document 802 based on the learning data 209, and outputs the classified information 201.

Hereinafter, a detail of the first learning classifying process (S130) will be explained.

First, the classifying unit 220 inputs the learning document 802 from the input equipment, and further inputs the learning data 209 from the learning filter memory unit 290.

The learning data 209 is statistic information generated by the learning unit 210 based on the correct answer information 803, and statistic information which is common to each input document 801 belonging to the category is prescribed for each category of the document. For example, the appearance frequency of each term appeared in the document belonging to the category is prescribed in the learning data 209 as the statistic information.

Hereinafter, it is assumed that the appearance frequency of each term is prescribed for each category in the learning data 209.

The appearance frequency shows, for example, the number of appearances per one input document 801 or the number of appearances per the number of characters.

Next, the classifying unit 220 extracts each word included in the learning document 802, and calculates the appearance frequency of each word extracted from the learning document 802.

For example, each word included in the learning document 802 can be extracted by searching the learning document 802 using the term prescribed in the learning data 209 as a search keyword, or can be extracted by the morphological analysis for the learning document 802.

Next, the classifying unit 220 compares the appearance frequency of each word included in the learning document 802 and the appearance frequency of each term prescribed in the learning data 209, and specifies the category to which the learning document 802 belongs.

For example, the classifying unit 220 calculates a probability (classification probability) that the learning document 802 belongs to for each category based on the appearance frequency of each word included in the learning document 802 and the appearance frequency of each term prescribed in the learning data 209. Then, the classifying unit 220 specifies a category having the highest classification probability or a category having the classification probability being equal to or greater than a predetermined threshold value (the first threshold value of the classification probability) as the category to which the learning document 802 belongs.

For example, the classification probability is calculated based on the Naive Bayesian classification by the following expression 1.

[numerical expression 1]

$$P(c_k \mid d_m) = \frac{P(c_k)\prod_{i=1}^{n} P(x_i \mid c_k)}{\sum_{c_j} P(c_j)\prod_{i=1}^{n} P(x_i \mid c_j)} \quad \text{(expression 1)}$$

where $P(c_k \mid d_m)$: the classification probability that the input document $d_m$ belongs to the classifying category $c_k$ $c_k$: the classifying category $d_m$: the input document 801

$x_i$: the word included in the input document $d_m$ $$P(c_k) = \frac{\text{the number of learning document 802 belonging to the classifying category } c_k}{\text{the number of all learning documents 802}}$$

-continued $$P(x_i \mid c_k) = \frac{\text{the number of learning document 802 containing the word } x_i \text{ and belonging to the classifying category } c_k}{\text{the number of learning documents 802 belonging to the classifying category } c_k}$$

Then, the classifying unit 220 outputs the specified category to which the learning document 802 belongs as the classified information 201 to the learning unit 210. Further, the classification probability of the category can be prescribed in the classified information 201.

Next, a detail of the first correct answer comparing process (S140) shown in FIG. 4 will be explained.

<S140: First Correct Answer Comparing Process>

After S130, the learning unit 210 of the learning filter unit 200 compares the classified information 201 and the correct answer information 803, and accumulates the classifying error presence information 202 as the learning result information 309.

Hereinafter, a detail of the first correct answer comparing process (S140) will be explained.

First, the learning unit 210 inputs the classified information 201 outputted by the classifying unit 220, and further inputs the correct answer information 803 from the input equipment.

Next, the learning unit 210 compares the classified information 201 and the correct answer information 803, discriminates whether the matched information 101 matches the correct answer information 803 or not.

For example, it is assumed that one category is prescribed in the correct answer information 803. At this time, the learning unit 210 discriminates that the classified information 201 matches the correct answer information 803 when the category prescribed in the correct answer information 803 is shown in the classified information 201.

Further, for example, it is assumed that plural categories are prescribed in the correct answer information 803. At this time, the learning unit 210 discriminates that the classified information 201 matches the correct answer information 803 when at least one category among the plural categories prescribed in the correct answer information 803 is shown in the classified information 201. Further, the learning unit 210 can discriminate that the matched information 101 matches the correct answer information 803 only when all plural categories prescribed in the correct answer information 803 are shown in the classified information 201. Further, the learning unit 210 can discriminate whether the classified information 201 matches the correct answer information 803 or not for each category.

Then, the learning unit 210 accumulates the classifying error presence information 202 showing the discriminated result in the result discrimination memory unit 390 as the learning result information 309.

The classifying error presence information 202 shows the match of the classified information 201 and the correct answer information 803 as "correct answer" and shows the mismatch of the classified information 201 and the correct answer information 803 as "error".

Next, the learning process (S150) shown in FIG. 4 will be explained.

<S150: Learning Process>

The learning unit 210, based on the discriminated result of the first correct answer comparing process (S140), discriminates the necessity of learning (S151), and if it is discriminated that the learning is necessary, the learning unit 210 generates the learning data 209 based on the learning document 802 and the correct answer information 803 (S152).

Hereinafter, a detail of S151 and S152 will be explained.

<S151: Learning Necessity Discriminating Process>

If it is discriminated that the classified information 201 does not match the correct answer information 803 at the first correct answer comparing process (S140), the learning unit 210 discriminates that the learning is necessary, and if it is discriminated that the classified information 201 matches the correct answer information 803 at the first correct answer comparing process (S140), the learning unit 210 discriminates that the learning is unnecessary.

The learning means to generate the learning data 209.

The learning data 209 is generated only when the classified information 201 does not match the correct answer information 803, namely, only when the classification error occurs, thereby decreasing unnecessary learning, reducing the time for learning, and improving the classification precision.

Further, the learning unit 210 can discriminate necessity of learning based on the classification probability calculated by the classifying unit 220 at the first learning classifying process (S130) or the category shown by the correct answer information 803.

For example, even if it is discriminated that the classified information 201 matches the correct answer information 803, when the classification probability of the category prescribed in the classified information 201 is equal to or less than a predetermined threshold value (the second threshold value of the classification probability), the learning unit 210 can discriminate that sufficient learning has not been carried out and the learning is necessary. This operation enables to further improve the classification precision.

Further, for example, the learning unit 210 can discriminate that the learning is necessary when the category prescribed in the correct answer information 803 is a specific category regardless of whether the classified information 201 and the correct answer information 803 are matched or mismatched. For example, if "personal information" is the specific category, the learning document 802 belonging to the category of "personal information" always becomes a target for learning.

Further, the learning unit 210 can always discriminate that the learning is necessary regardless of whether the classified information 201 and the correct answer information 803 are matched or mismatched, and all the learning documents 802 can be a target for learning. Namely, it is not always required to carry out the learning necessity discriminating process (S151).

If it is discriminated that the learning is unnecessary, S160 is carried out next.

<S152: Learning Data Generating Process>

If it is discriminated at S151 that the learning is necessary, the learning unit 210 analyzes the learning document 802, calculates the statistic information of the learning document 802, and reflects the calculated statistic information to the learning data 209 as the statistic information of the input document 801 belonging to the same category.

For example, the learning unit 210 carries out the statistic process based on the algorithm using the Bayesian theory (the Bayesian statistics), the SVM, or the neural network model, and calculates the statistic information of the learning document 802.

For example, the statistic information shows the appearance frequency of each term as has been discussed.

<S160>

Next, the information filtering system 900 (for example, the string matching filter unit 100, the learning filter unit 200) discriminates whether all learning documents 802 inputted by the user have been processed or not.

If there is unprocessed learning document 802, each process of S110 through S150 is carried out for the unprocessed learning document 802. Namely, the string matching filter unit 100 and the learning filter unit 200 carry out each process of S110 through S150 for each learning document 802.

If it is discriminated that all learning documents 802 have been processed, the error rate calculating process (S170) is carried out next.

<S170: Error Rate Calculating Process>

After processes of S110 through S150 are carried out for all learning documents 802, the error rate calculating unit 310 of the result discriminating unit 300 calculates the classifying error rate of the string matching filter unit 100 and the classifying error rate of the learning filter unit 200 based on the learning result information 309.

Hereinafter, a detail of the error rate calculating process (S170) will be explained.

First, the error rate calculating unit 310 of the result discriminating unit 300 inputs the learning result information 309 from the result discrimination memory unit 390. The learning result information 309 includes each matching error presence information 102 outputted from the correct answer comparing unit 120 of the string matching filter unit 100 and each classifying error presence information 202 outputted from the learning unit 210 of the learning filter unit 200. Namely, the learning result information 309 shows the classification correctness of the string matching filter unit 100 and the classification correctness of the learning filter unit 200 for each learning document 802.

Next, the error rate calculating unit 310 calculates the classifying error rate of the string matching filter unit 100 and the classifying error rate of the learning filter unit 200 by computing the following expression 2 based on the learning result information 309.

the classifying error rate=the number of error occurrences/the number of the learning documents (expression 2)

"The number of error occurrences" means the number of pieces of the matching error presence information 102 or the classifying error presence information 202 in which "error" is prescribed.

"The number of learning documents" shows the total sum of the learning documents 802. Further, "the number of learning documents" means the sum of the matching error presence information 102 in which "error" is prescribed and the matching error presence information 102 in which "correct answer" is prescribed (the total sum of the number of pieces of the matching error presence information 102), or the sum of the classifying error presence information 202 in which "error" is prescribed and the classifying error presence information 202 in which "correct answer" is prescribed (the total sum of the number of pieces of the classifying error presence information 202).

The error rate calculating unit 310 can calculate the latest classifying error rate using the learning result information 309 accumulated within a predetermined period. The classification error may occur when a lot of new terms are contained in the classifying target document 804. Namely, the occurrence frequency of the classification error changes with the passage of time, and the old classification precision information becomes unimportant. Here, the error rate calculating unit 310 can deal with the change of the occurrence frequency of the classification error by considering the occurrence frequency of the latest classification error. For example, the learning result information 309 accumulated within the predetermined period means the learning result information 309 of a predetermined number of cases in an order of new generation (for example, the learning result information 309 of the latest 100 cases). Further, for example, the learning result information 309 accumulated within the predetermined period means the learning result information 309 generated within a predetermined past time period using the time of calculating the classifying error rate or the time of generating the latest learning result information 309 as a reference (for example, the learning result information 309 generated within the last one month).

Then, the error rate calculating unit 310 stores the classifying error rate of the string matching filter unit 100 and the classifying error rate of the learning filter unit 200 in the result discrimination memory unit 390 as the error rate information 308.

The error rate information 308 is information showing a degree of reliability of classification of the string matching filter unit 100 and a degree of reliability of classification of the learning filter unit 200 with a classifying error rate.

Up to the above, the learning result generating process (S110 through S170) has been explained. In the above learning result generating process (S110 through S170), the processes (S110 through S120) carried out by the string matching filter unit 100 and the processes (S130 through S150) carried out by the learning filter unit 200 are independent mutually, which can be processed in parallel. For example, the information filtering system 900 can create one thread of the process of the string matching filter unit 100 and as well another thread of the process of the learning filter unit 200 to carry out the multithread processing of the process of the string matching filter unit 100 and the process of the learning filter unit 200. The process of the string matching filter unit 100 and the process of the learning filter unit 200 are carried out in parallel, thereby reducing the time required for the learning result generating process (S110 through S170).

By the above learning result generating process (S110 through S170), the learning data 209, the learning result information 309, and the error rate information 308 are generated.

FIG. 6 is a flowchart showing a flow of the filtering process of the information filtering system 900 according to the first embodiment.

A filtering method to specify a category to which the classifying target document 804 belongs using the learning data 209 and the error rate information 308 generated by the learning result generating process (S110 through S170) will be explained in the following with reference to FIG. 6.

Each unit configuring the information filtering system 900 implements each process which will be explained in the following using the CPU.

<S210: Second Classifying Process>

The string matching unit 110 of the string matching filter unit 100, as well as the second learning classifying process (S110), carries out the string matching of the classifying target document 804 based on the matching condition information 109 and outputs the matched information 101.

At S210, the target of the string matching is not the learning document 802 but the classifying target document 804, and the destination of outputting the matched information 101 is not the correct answer comparing unit 120 but the result outputting unit 320 of the result discriminating unit 300.

<S220: First Classifying Process>

The classifying unit 220 of the learning filter unit 200, as well as the first learning classifying process (S130), classifies the classifying target document 804 based on the learning data 209 and outputs the classified information 201.

At S220, the classification target is not the learning document 802 but the classifying target document 804, and the destination of outputting the classified information 201 is not the learning unit 210 but the result outputting unit 320 of the result discriminating unit 300.

<S230: Result Outputting Process>

The result outputting unit 320 of the result discriminating unit 300 outputs the classified result 301 based on the matched information 101, the classified information 201, and the error rate information 308. Hereinafter, a detail of the result outputting process (S230) will be explained.

First, the result outputting unit 320 inputs the matched information 101 outputted by the string matching unit 110 of the string matching filter unit 100 at the process of S210, inputs the classified information 201 outputted by the classifying unit 220 of the learning filter unit 200 at the process of S220, and inputs the error rate information 308 from the result discrimination memory unit 390.

Next, the result outputting unit 320 specifies a category to which the classifying target document 804 belongs based on the matched information 101, the classified information 201, and the error rate information 308.

For example, the result outputting unit 320 refers to the error rate information 308 and selects a category specified by the filter unit (the string matching filter unit 100 or the learning filter unit 200) having a smaller classifying error rate (the one having a larger degree of reliability of classification) as a category to which the classifying target document 804 belongs.

Namely, if the classifying error rate of the string matching filter unit 100 is smaller than the classifying error rate of the learning filter unit 200, the result outputting unit 320 deems a category for which "matched" is prescribed in the matched information 101 of the string matching filter unit 100 to be the category of the classifying target document 804. Further, if the classifying error rate of the learning filter unit 200 is smaller than the classifying error rate of the string matching filter unit 100, the result outputting unit 320 deems a category prescribed in the classified information 201 of the learning filter unit 200 to be the category of the classifying target document 804. Further, if the classifying error rate of the string matching filter unit 100 and the classifying error rate of the learning filter unit 200 are the same (or have a difference within a predetermined range), the result outputting unit 320 obtains a logical sum of the category for which "matched" is prescribed in the matched information 101 and the category prescribed in the classified information 201, and the result outputting unit 320 deems each category shown by the logical sum to be the category of the classifying target document 804. For example, if "matched" is prescribed in the matched information 101 for categories of A and B, and categories of B and C are prescribed in the classified information 201, the categories of the classifying target document 804 are A, B, and C.

Further, for example, the result outputting unit 320 specifies the category to which the classifying target document 804 belongs based on the comparison result of the weighted average value of the matched information 101 and the classified information 201 with a predetermined threshold value.

At this time, the result outputting unit 320 shows the matched information 101 and the classified information 201 by predetermined numeral values. For example, the matched information 101 is mapped to "0", and the classified information 201 is mapped to "1".

Next, the result outputting unit 320, using the following expression 3, calculates a weighted average value based on the weighted value of the weighted numeral value of the matched information 101 and the weighted value of the weighted numeral value of the classified information 201. In the following expression 3, the matched information 101 and the classified information 201 are weighted by the classifying correct answer rate for each filter unit for the sum of the classifying correct answer rate (=1−the classifying error rate) (a degree of reliability of classification) of both filter units.

$$\text{the weighted average value} = \text{the matching filter result} \times (\text{the matching filter correct answer rate}/(\text{the matching filter correct answer rate} + \text{the learning filter correct answer rate})) + \text{the learning filter result} \times (\text{the learning filter correct answer rate}/(\text{the matching filter correct answer rate} + \text{the learning filter correct answer rate}))$$

(expression 3)

"The matching filter result" shows a numeral value (for example, "0") of the matched information 101.

"The learning filter result" shows a numeral value (for example, "1") of the classified information 201.

"The matching filter correct answer rate" shows the classifying correct answer rate of the string matching filter unit 100.

"The learning filter correct answer rate" shows the classifying correct answer rate of the learning filter unit 200.

The first term (the matching filter result×( . . . the learning filter correct answer rate)) of the expression 3 shows the weighted value of the matched information 101, and the second term (the learning filter result×(the learning filter correct answer rate)) of the expression 3 shows the weighted value of the classified information 201.

Then, the result outputting unit 320 compares the weighted average value calculated by the above expression 3 and a predetermined threshold value, and specifies the category of the classifying target document 804 based on the comparison result.

For example, when the numeral value of the matched information 101 is "0", the numeral value of the classified information 201 is "1", the classifying correct answer rate of the string matching filter unit 100 is "0.6 (60%)", and the classifying correct answer rate of the learning filter unit 200 is "0.4 (40%)", the weighted average value becomes "0.4 (=(0×0.6)+(1×0.4))". At this time, if the threshold value is "0.5", the weighted average value (0.4) is less than the threshold value, and is closer to the value (0) of the matched information 101 compared with the threshold value, so that the result outputting unit 320 deems a category for which "matched" is prescribed in the matched information 101 to be the category of the classifying target document 804. Further, if the threshold value is "0.3", the weighted average value (0.4) is greater than the threshold value, and is closer to the value (1) of the classified information 201 compared with the threshold value, so that the result outputting unit 320 deems a category prescribed in the classified information 201 to be the category of the classifying target document 804.

Namely, if the weighted average value is less than the threshold value, the result outputting unit 320 deems the category specified by the filter unit to which the value being less than the threshold value is mapped to be the category of the classifying target document 804, and if the weighted average value is equal to or greater than the threshold value, the result outputting unit 320 deems the category specified by the filter unit to which the value being equal to or greater than the threshold value is mapped to be the category of the classifying target document 804.

The threshold value used for comparing with the weighted average value shows a degree of importance put on the result of which filter unit.

Further, for example, the result outputting unit 320 multiplies a weighting coefficient showing the degree of importance for the result of each filter unit to the classifying correct answer rate of each filter unit, compares the weighted classifying correct answer rate of each filter unit, and deems a category specified by the filter unit having the larger weighted classifying correct answer rate to be the category of the classifying target document 804.

When the classifying correct answer rate of the string matching filter unit 100 and the classifying correct answer rate of the learning filter unit 200 are both "0.5 (50%)", a weighting coefficient of the matched information 101 is "0.7", a weighting coefficient of the classified information 201 is "1.0", the result outputting unit 320 compares the weighted classifying correct answer rate of the string matching filter unit 100 of "0.35 (=0.5×0.7)" and the weighted classifying correct answer rate of the learning filter unit 200 of "0.5 (=0.5×1.0)". Then, since the weighted classifying correct answer rate of the learning filter unit 200 is larger, the result outputting unit 320 deems a category specified by the learning filter unit 200 to be the category of the classifying target document 804.

Further, for example, the result outputting unit 320 compares the classification probability of the category prescribed in the classified information 201 with a predetermined threshold value (the third threshold value of the classification probability); if the classification probability is equal to or greater than the threshold value, the result outputting unit 320 deems a category prescribed in the classified information 201 is the category of the classifying target document 804, and if the classification probability is less than the threshold value, the result outputting unit 320 deems the category for which "matched" is prescribed in the matched information 101 to be the category of the classifying target document 804. Namely, the result outputting unit 320 specifies the category of the classifying target document 804 according to the size of the classification probability of the category prescribed in the classified information 201.

Further, for example, if the priority keyword is previously prescribed in the matching condition information 109 of the string matching filter unit 100, and further, and when "matched" is prescribed for the category to which the priority keyword belongs in the matched information 101, the result outputting unit 320 deems the category, to which the priority keyword belongs, to be the category to which the classifying target document 804 belongs regardless of the size of the classifying error rate and the weighted average value.

For example, in the matching condition information 109, when each classifying keyword 108 belonging to the category is grouped, and each group is identified by an ID, the ID of each group is represented by a 64-bit integer, and as well the most significant bit is used as a priority flag. The priority keyword in this case is all classifying keywords 108 belonging to a group (a priority group) for which "1" is set to the priority flag of the ID.

In the application field of the confidential information detection, there are some cases in which it is required to detect 100% of certain specific contents (the input document 801)

among confidential information. For example, such a case is when the user wants to detect 100% of the document including the description of "xxx company limited" showing a specific customer. Even if this is the case, the information filtering system 900 in which the priority keyword is prescribed can detect 100% of the specific document including the priority keyword without relying on the statistical method (the classifying method of the learning filter unit 200).

Further, according to the change of the environment of the user and so on, if the vocabulary of the terms to be detected (the classifying keyword 108) is largely increased, the user makes a new group of a category of "new technology information" from the increased amount of new terms, it is possible to obtain the classified result 301 with high precision for a category of "new technology information" from the information filtering system 900 by setting the priority flag in the new group. The information filtering system 900 in which the priority flag is set in the group of new terms, even at the time when the learning for the learning document 802 including the new terms has not been done yet by the learning filter unit 200, the classifying target document 804 is classified to the category of "new technology information" corresponding to the new terms, and thereby the decrease of precision of the classified result 301 can be suppressed. Further, the information filtering system 900 outputs the classified result 301 with high precision for the category of "new technology information", and thereby the user can feedback the classifying target document 804 belonging to the category of "new technology information" as the learning document 802 to the information filtering system 900, and the classification precision of the learning filter unit 200 can be improved.

The result outputting unit 320 that specifies a category to which the classifying target document 804 belongs sets the specified category in the classified result 301 and outputs the classified result 301 to the output equipment.

The result outputting unit 320 sets the category specified by the filter unit having the higher degree of reliability of classification, thereby improving the precision of the classified result 301.

Further, the result outputting unit 320 can also set the category specified by the filter unit which has not been selected in the classified result 301 as the reference information. By this operation, it is possible to prompt the user to judge the result comprehensively.

In the above filtering process (S210 through S230), the process of the string matching filter unit 100 (S210) and the process of the learning filter unit 200 (S220) can be carried out in parallel. The process of the string matching filter unit 100 and the process of the learning filter unit 200 are carried out in parallel, thereby reducing the time required for the filtering process (S210 through S220).

By the above filtering process (S210 through S230), the classified result 301 showing the category to which the classifying target document 804 belongs is outputted.

The information filtering system 900 carries out the above filtering process (S210 through S230) for each of the inputted classifying target document 804.

FIG. 7 is a flowchart showing the operation procedure of the information filtering system 900 according to the first embodiment.

The operational method of the information filtering system 900 according to the first embodiment will be explained in the following with reference to FIG. 7.

<S310: Matching Condition Setting Process>

First, the user defines the classifying keyword 108 to generate the matching condition information 109 and stores the generated matching condition information 109 in the string matching filter memory unit 190 of the string matching filter unit 100.

<S320: Learning Result Generating Process>

Next, the user inputs the learning document 802 and the correct answer information 803 to the information filtering system 900, and makes the information filtering system 900 carry out the learning result generating process (S110 through S170) which has been explained with reference to FIG. 4. The information filtering system 900 carries out the learning result generating process (S110 through S170) and generates the learning result information 309.

However, the user is not always required to carry out the learning result generating process (S320).

<S330: Filtering Process>

Next, the user inputs the classifying target document 804 to the information filtering system 900 and makes the information filtering system 900 carry out the filtering process (S210 through S230) which has been explained with reference to FIG. 6. The information filtering system 900 carries out the filtering process (S210 through S230) and outputs the classified result 301.

<S340: Feedback Discriminating Process>

Next, the user discriminates whether it is necessary to feedback the classifying target document 804 to the information filtering system 900 as the learning document 802 or not based on the classified result 301.

If it is discriminated that the feedback is unnecessary, the user forwards the process to S360.

The information filtering system 900 can improve the classification precision of the learning filter unit 200 by the feedback of the classifying target document 804. The user can discriminate whether to feedback or not with considering the trade-off with the working amount of the user. The information filtering system 900 can accelerate the improvement of the classification precision of the learning filter unit 200 by carrying out the feedback of all the filtered documents (all classifying target documents 804 for which the classified result 301 is outputted). However, the user generally sets only the classifying target document 804 which matches the specific condition (for example, the one classified to the category of "new technical terms") as the feedback target, and thereby it is possible to improve the classification precision of the learning filter unit 200 of the information filtering system 900 with the minimum working amount of the user.

<S350: Learning Data Generating Process>

The user who discriminates the feedback is necessary at S340 inputs the classifying target document 804 to the information filtering system 900 as the learning document 802, as well generates the correct answer information 803 of the classifying target document 804, and inputs the generated correct answer information 803 to the information filtering system 900. In the information filtering system 900 to which the learning document 802 and the correct answer information 803 are inputted, the learning filter unit 200 implements the learning data generating process (S152) which has been explained with reference to FIG. 4 based on the learning document 802 and the correct answer information 803, and the learning filter unit 200 generates the learning data 209.

<S360>

The user discriminates whether all classifying target documents 804 have been processed by the information filtering system 900 or not.

If there is any unprocessed classifying target document 804, the user returns the process to S310.

If all classifying target documents 804 have been processed, the user terminates the operation of the information filtering system 900.

In the above explanation, the classification of the confidential information document is discussed as an example; however, the information filtering system 900 does not limit the classification target to the confidential information, but the information filtering system 900 can be widely and generally used for classifying documents. Further, in the above explanation, the classification of the Japanese documents is noted as an example; however, the information filtering system 900 does not limit the classification target to the Japanese document, but the information filtering system 900 is applicable to documents of any kind of character codes. Further, in the above explanation, the string matching filter unit 100 is noted as an example of a non-learning filter. However, even if a filter is the one like the learning filter unit 200 which generates the classifying condition (the learning data 209) by learning, when the classifying condition is previously generated by the learning which has been previously done and no additional learning is done, the classifying condition becomes the fixed one, and accordingly, it is possible to treat this filter as the non-learning filter.

In the first embodiment, the following information filtering system 900 has been explained.

The information filtering system 900 includes two or more filters (the string matching filter unit 100, the learning filter unit 200) for discriminating which category the input document 801 belongs to among predetermined plural categories.

Further, the information filtering system 900 includes the learning filter unit 200 for discriminating the final result (the classified result 301) of the classification of the input document 801 from the result of each filter (the matched information 101, the classified information 201).

Among the filters, at least one filter is the learning filter unit 200 which inputs an input document for learning sample (the learning document 802) appended with the correct answer information 803 showing which category among plural categories corresponding to, carries out learning, updates the learning data 209, and discriminates which category the input document for filtering target (the classifying target document 804) belongs to based on the learning data.

At the time of learning operation, each filter compares the correct answer information 803 and the classified result (the matched information 101, the classified information 201) of the learning sample input document, discriminates whether an error occurs or not, and outputs the error information (the matching error presence information 102, the classifying error presence information 202).

The result discriminating unit 300 accumulates the error information of each filter and calculates an error rate of each filter.

The result discriminating unit 300, at the time of classifying operation, outputs the final result (the classified result 301) according to the discriminated result (the matched information 101, the classified information 201) and the error information of each filter.

Further, in the information filtering system 900, at least one filter (the string matching filter unit 100) among the above filters is a non-learning filter which does not update the learning data (the matching condition information 109) at the time of learning operation, but only outputs the error information (the matching error presence information 102).

Further, the result discriminating unit 300 outputs a result of the filter having a small error rate as the final result.

Further, the result discriminating unit 300 calculates a weighted average of the discriminated result of each filter according to the error rate, and outputs the final result.

Further, at the time of accumulating the error information, the result discriminating unit 300 accumulates a predetermined number of pieces of error information in the past.

Further, the non-learning filter carries out the string matching on the input document based on at least one matching condition (the classifying keyword 108), and sets whether the matched result matches the correct answer information 803 as the discriminated result (the matching error presence information 102).

Further, the matching condition is expressed by a set of a combination (group) of the matching condition ID and the corresponding matching condition.

The string matching filter outputs the discriminated result to show whether it is matched for each matching condition ID.

The result discriminating unit 300 outputs the input document 801 as the final result if the input document 801 matches the specific matching condition ID regardless of other results.

Further, the string matching filter carries out the string matching by the deterministic finite automaton (DFA).

Further, the string matching filter compiles the matching condition to generate a state transition table, stores the state transition table as a matching condition file, and carries out the matching process using the state transition table shown by the matching condition file.

Further, the string matching filter carries out the string matching by the nondeterministic finite automaton (NFA).

Embodiment 2

In the second embodiment, an information filtering system 900 including plural learning filter units will be explained.

Hereinafter, elements being different from the first embodiment will be mainly explained, and elements for which the explanation is omitted are deemed to be the same as the ones of the first embodiment.

FIG. 8 shows a functional configuration diagram of the information filtering system 900 according to the second embodiment.

The functional configuration of the information filtering system 900 according to the second embodiment will be explained in the following with reference to FIG. 8.

The information filtering system 900 includes plural learning filter units 200 of a learning filter unit 200a, a learning filter unit 200b, a learning filter unit 200c, etc. The plural learning filter units 200 are referred to as a learning filter aggregating unit 400.

Each learning filter unit 200 such as the learning filter unit 200a, the learning filter unit 200b, the learning filter unit 200c, etc. is provided with the learning unit 210, the classifying unit 220, and the learning filter memory unit 290 (illustration omitted) as well as the learning filter unit 200 of the first embodiment, and includes the same function as the learning filter unit 200 of the first embodiment.

However, the learning unit 210 of each learning filter unit 200 carries out different statistic process. For example, the learning unit 210 of the learning filter unit 200a carries out the statistic process based on the Bayesian theory, the learning unit 210 of the learning filter unit 200b carries out the statistic process based on the SVM, and the learning unit 210 of the learning filter unit 200c carries out the statistic process based on the neural network model. By the above operation, each learning filter unit 200 generates its specific learning data 209, and generates the classified information 201 based on the each learning data 209.

By carrying out different statistic processes by respective learning filter units 200, the possibility that the classifying target document 804 is correctly classified by at least one of the learning filter units 200 is raised, and the classification precision of the classified result 301 is improved.

Each learning filter unit 200 outputs the classified information 201 for the classifying target document 804 to the result outputting unit 320.

In the result discrimination memory unit 390, the matching error presence information 102 of the string matching filter unit 100 and the classifying error presence information 202 of each learning filter unit 200 are accumulated as the learning result information 309.

The error rate calculating unit 310 can deem each classifying error rate calculated for each learning filter unit 200 to be the classifying error rate of the learning filter aggregating unit 400, or can calculate the classifying error rate of the learning filter aggregating unit 400 by combining the classifying error rates of the respective learning filter units 200. For example, the classifying error rate of the learning filter aggregating unit 400 is an average value of classifying error rates of the respective learning filter units 200, the maximum value or the minimum value among the classifying error rates of the respective learning filter units 200.

The error rate information 308 shows the classifying error rate of the string matching filter unit 100 and the classifying error rate of the learning filter aggregating unit 400.

The result outputting unit 320 specifies a category to which the classifying target document 804 belongs based on the classifying error rate of the string matching filter unit 100 and the classifying error rate of the learning filter aggregating unit 400 as well as the first embodiment, and outputs the specified category as the classified result 301.

For example, if the classifying error rate of the string matching filter unit 100 is smaller than the combined classifying error rate of the learning filter aggregating unit 400, the result outputting unit 320 deems the category specified by the string matching filter unit 100 to be the category to which the classifying target document 804 belongs, and if the combined classifying error rate of the learning filter aggregating unit 400 is smaller than the classifying error rate of the string matching filter unit 100, the result outputting unit 320 deems the category specified by the learning filter aggregating unit 400 to be the category to which the classifying target document 804 belongs.

Further, for example, the result outputting unit 320 deems the category specified by the filter having the smallest classifying error rate to be the category to which the classifying target document 804 belongs among the string matching filter unit 100 and the respective learning filter units 200.

Further, the result outputting unit 320 deems the combined result of the classified information 201 of each learning filter unit 200 to be the category specified by the learning filter aggregating unit 400.

For example, the result outputting unit 320 combines respective pieces of the classified information 201 by the majority vote. Namely, the result outputting unit 320 deems the category prescribed in the largest number of pieces of classified information 201 among the categories prescribed in the classified information 201 of respective learning filter units 200 to be the category specified by the learning filter aggregating unit 400.

Further, for example, the result outputting unit 320 deems a logical sum of respective categories prescribed in each classified information 201 to be the combined result.

Further, for example, the result outputting unit 320, as well as the first embodiment, calculates a weighted average value of respective pieces of the classified information 201, compares the calculated weighted average value and a predetermined threshold value, selects one piece (or plural pieces) of the classified information 201 based on the comparison result, and deems the selected classified information 201 to be the combined result.

Further, for example, the result outputting unit 320 compares each of the weighted classifying correct answer rate of the learning filter unit 200 as well as the first embodiment, and the result outputting unit 320 deems the classified information 201 of the learning filter unit 200 having the highest classifying correct answer rate to be the combined result.

Further, for example, the result outputting unit 320 compares a classification probability of the category prescribed in each classified information 201, and the result outputting unit 320 deems the category having the highest classification probability to be the combined result.

Further, the result outputting unit 320 can unite the matched information 101 of the string matching filter unit 100 and the classified information 201 of each learning filter unit 200 using a majority vote, a logical sum, a weighted average value, a weighted classifying correct answer rate, etc., and the result outputting unit 320 can deem the combined result to be a category to which the classifying target document 804 belongs.

For example, when in order to detect the classifying target document 804 belonging to the confidential information, prevention of deficient detection has a priority and excessive detection is allowed, it is effective to use a method which deems the combined result by the logical sum to be a category to which the classifying target document 804 belongs.

Further, for example, when it is desired to suppress both deficient detection and excessive detection to the minimum, it is effective to use a method which deems the combined result by the majority vote to be a category to which the classifying target document 804 belongs.

Other matters such as the outer appearance, the hardware resource, the learning result generating process, the filtering process, and the operation procedure of the information filtering system 900 are the same as the first embodiment.

In the second embodiment, the following information filtering system 900 has been explained.

The result outputting unit 320 combines outputs of plural learning filters (the classified information 201) and deems as one output of the learning filter.

Further, when the result outputting unit 320 combines outputs of plural learning filters and deems as one output of the learning filter, the result outputting unit 320 combines outputs of respective learning filters with the logical sum.

Further, when the result outputting unit 320 combines outputs of plural learning filters and deems as one learning filter output, the result outputting unit 320 combines outputs of respective learning filters with the majority vote.

BRIEF EXPLANATION OF THE DRAWINGS

FIG. 5 shows an example of a state transition table of the DFA according to the first embodiment.

EXPLANATION OF SIGNS

Figure 1:
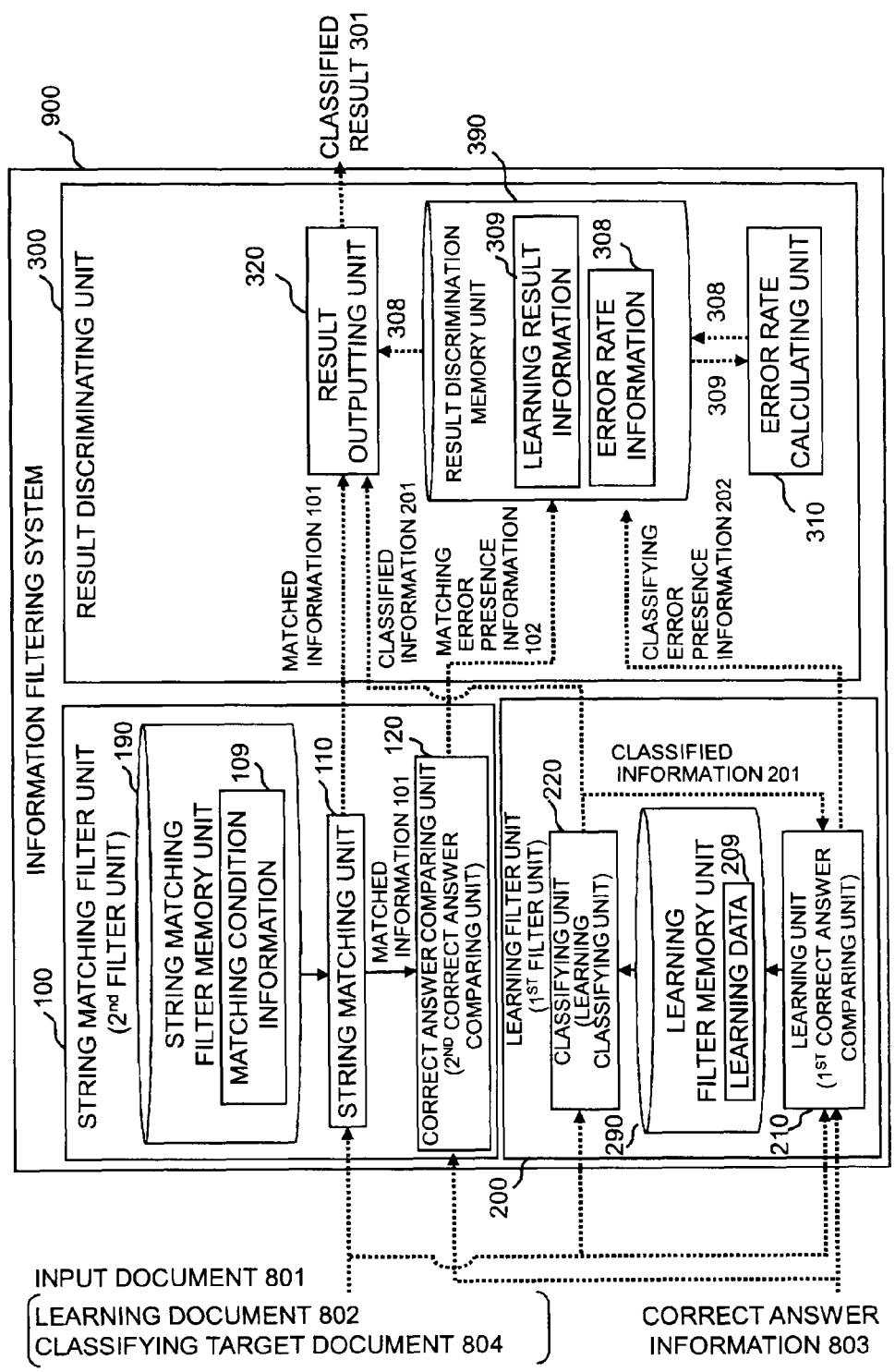
FIG. 1 is a functional configuration diagram of the information filtering system 900 according to the first embodiment.
Figure 2:
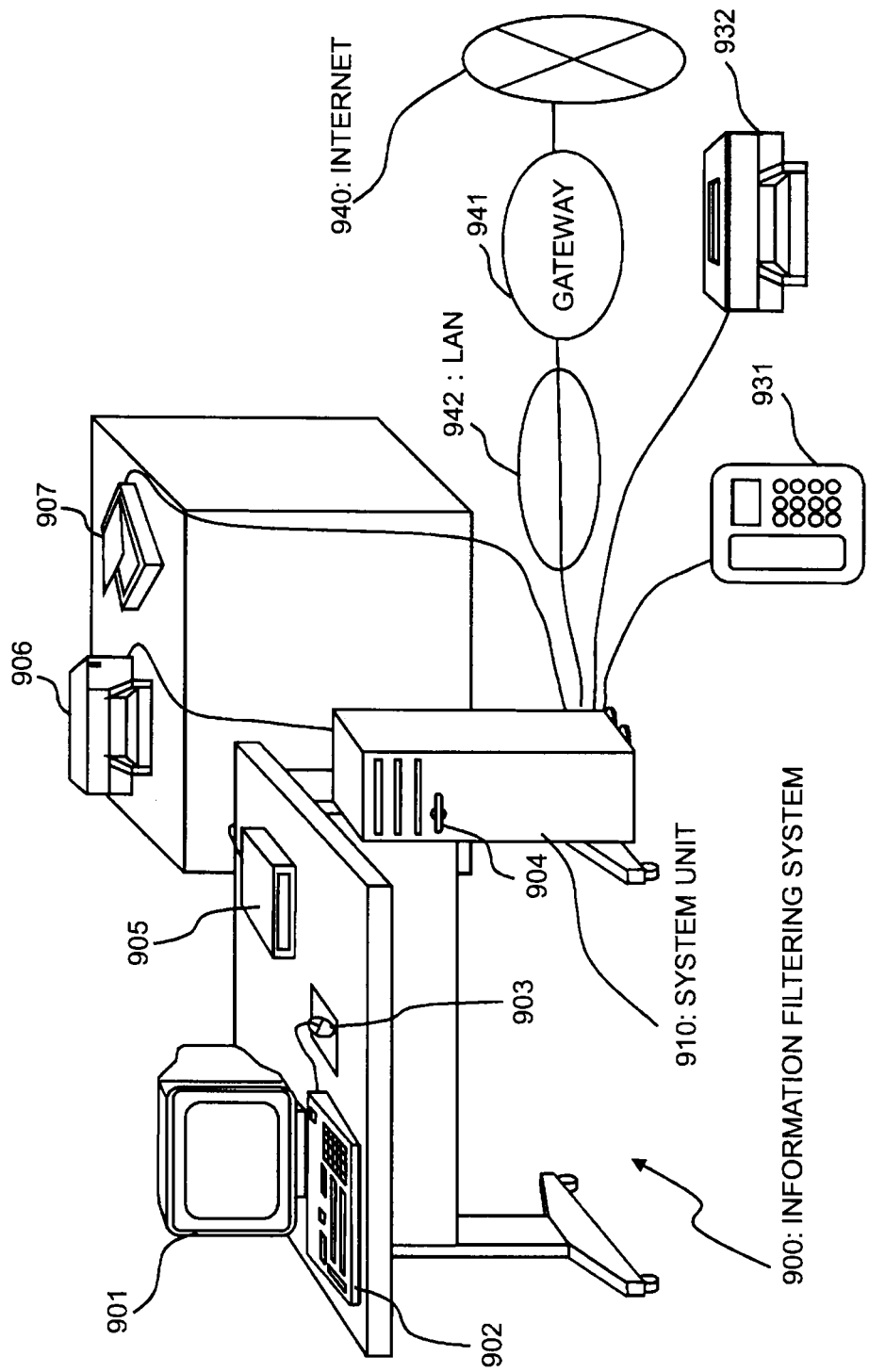
FIG. 2 shows an example of an outer appearance of the information filtering system 900 according to the first embodiment.
Figure 3:
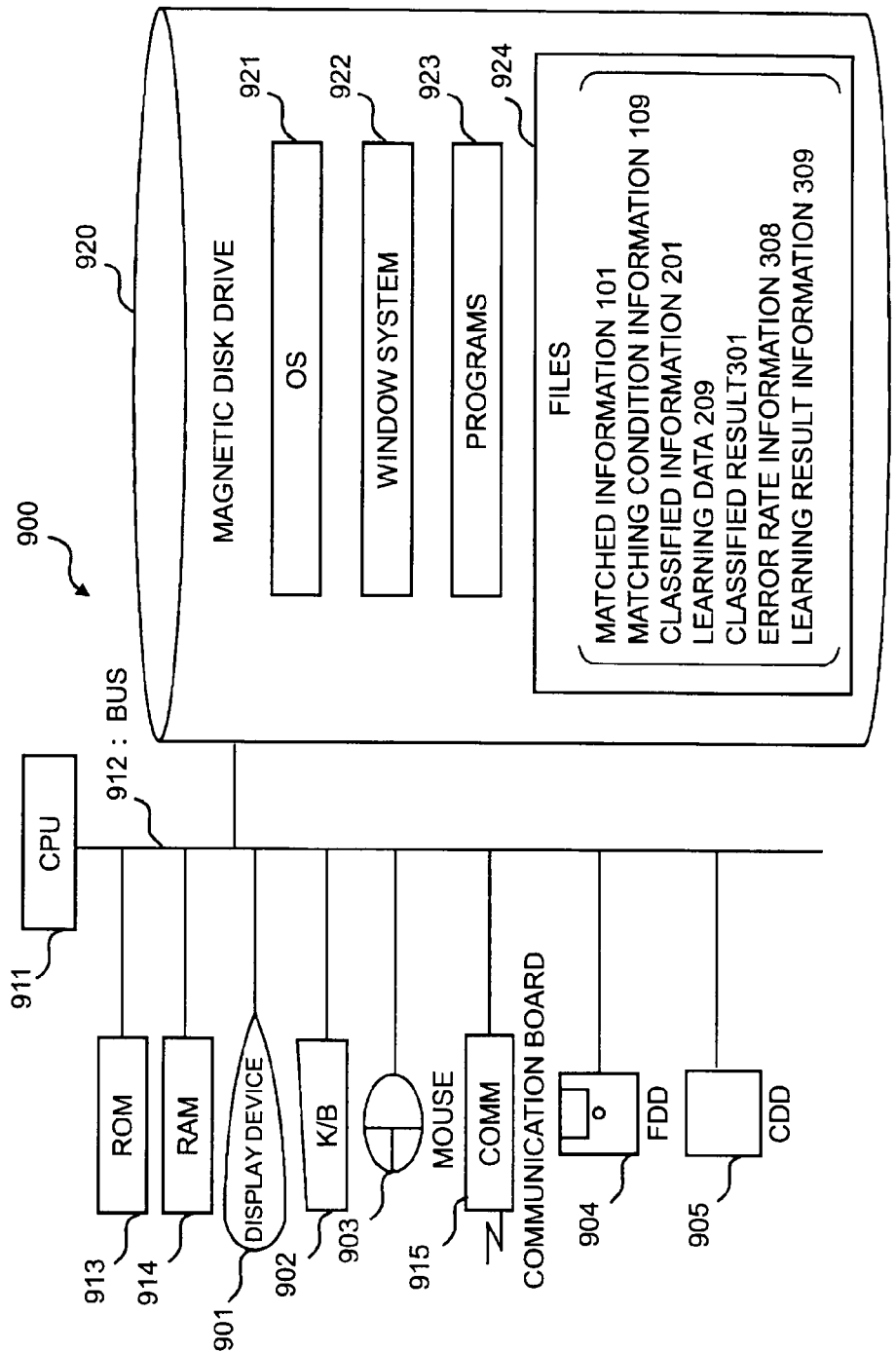
FIG. 3 shows an example of hardware resource of the information filtering system 900 according to the first embodiment.
Figure 4:
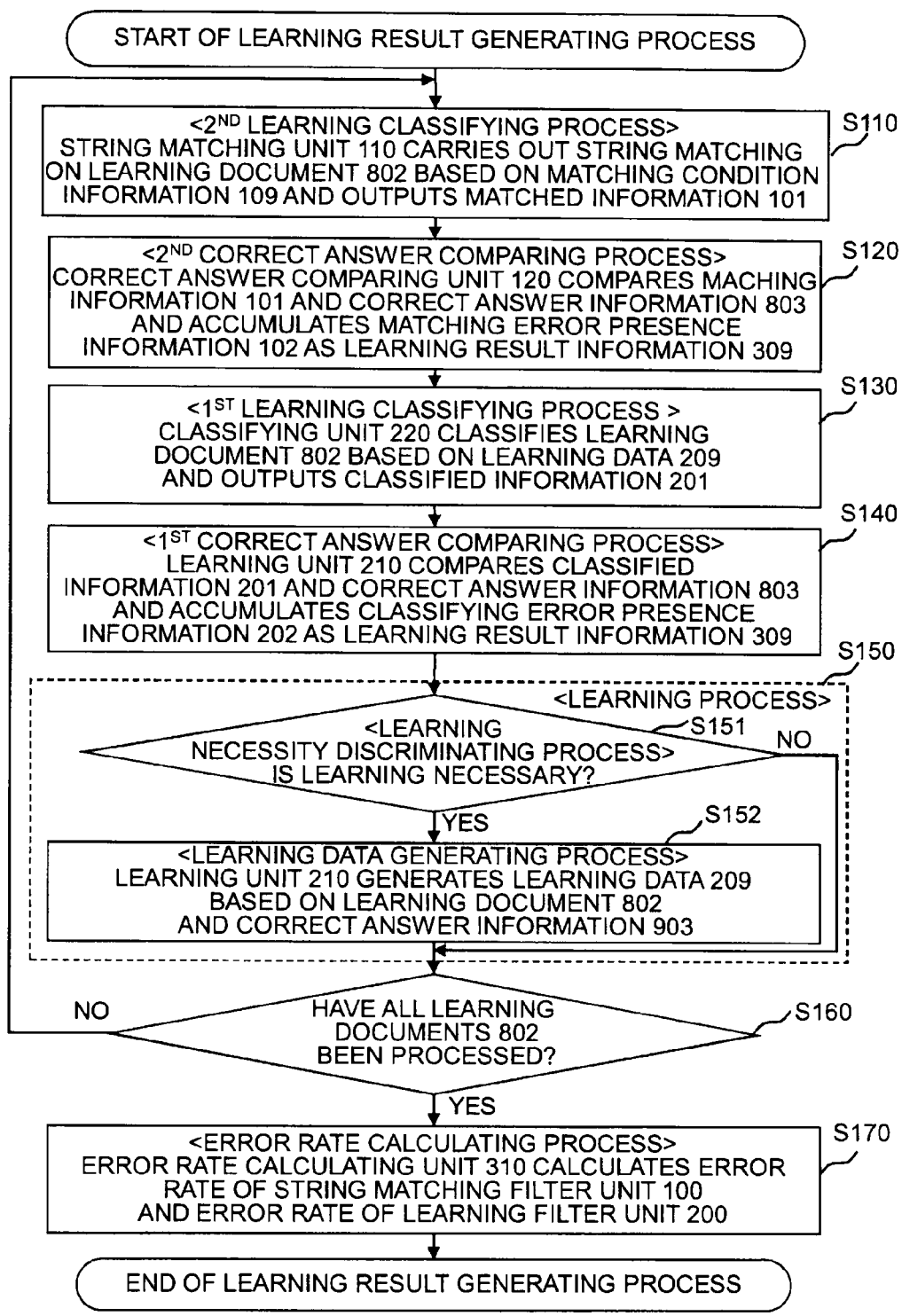
FIG. 4 is a flowchart showing a flow of a learning result generating process according to the first embodiment.
Figure 6:
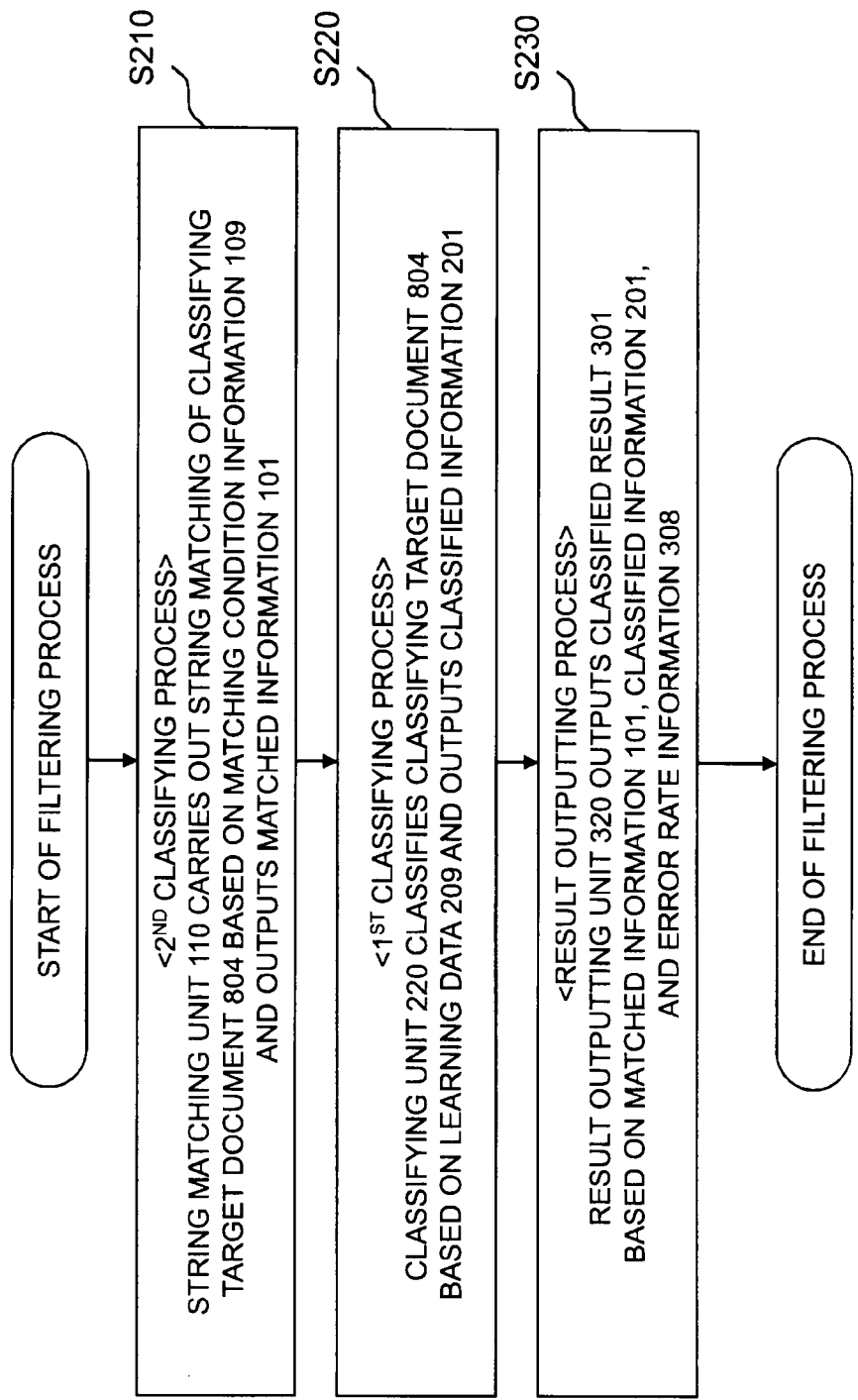
FIG. 6 is a flowchart showing a flow of a filtering process of the information filtering system 900 according to the first embodiment.
Figure 7:
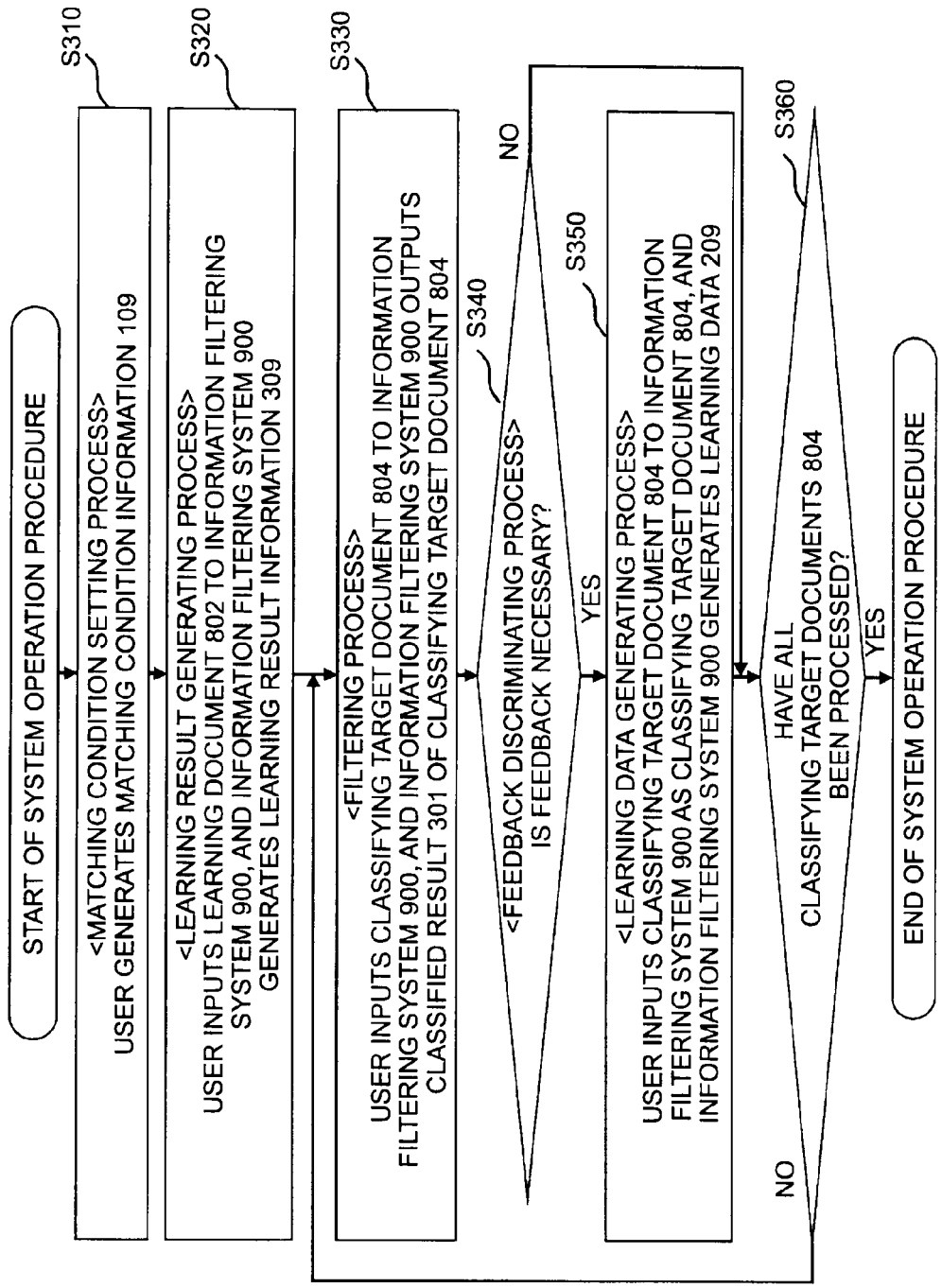
FIG. 7 is a flowchart showing an operation procedure of the information filtering system 900 according to the first embodiment.
Figure 8:
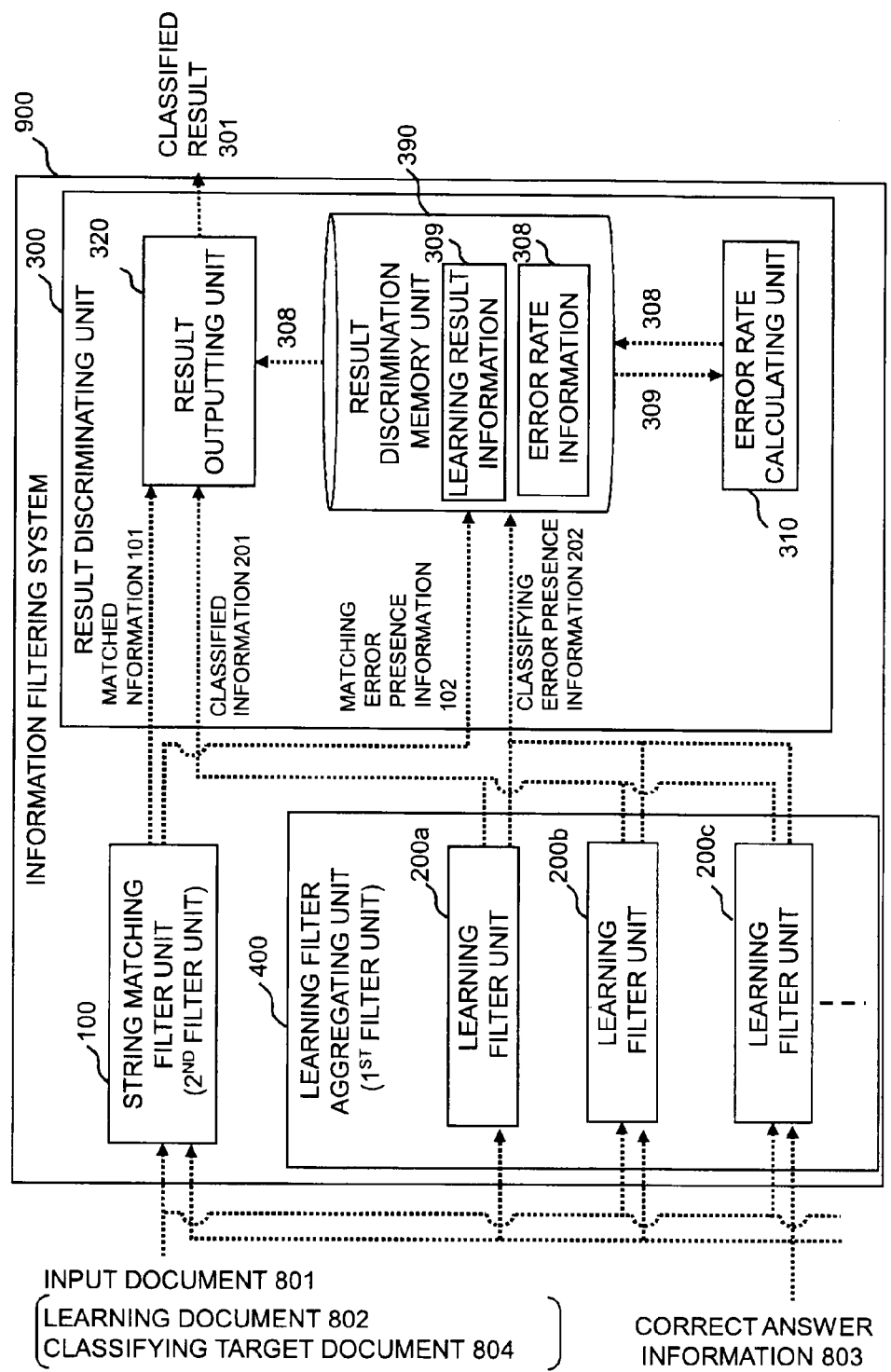
FIG. 8 shows a functional configuration diagram of the information filtering system 900 according to the second embodiment.

100: a string matching filter unit; 101: matched information; 102: matching error presence information, 108: a classifying keyword; 109: matching condition information, 110: a string matching unit; 120: a correct answer comparing unit, 190: a string matching filter memory unit; 200, 200a, 200b, and 200c learning filter units; 201: classified information; 202: classifying error presence information; 209: learning data, 210: a learning unit, 220: a classifying unit; 290: a learning filter memory unit; 300: a result discriminating unit; 301: classified result; 308: error rate information; 309: learning result information; 310: an error rate calculating unit; 320: a result outputting unit; 390: a result discrimination memory unit; 400: a learning filter aggregating unit; 801: an input document; 802: a learning document; 803: correct answer information; 804: classifying target document, 900: information filtering system, 901: a display device; 902: a keyboard; 903: a mouse; 904: a FDD; 905: a CDD; 906: a printer device; 907: a scanning device; 910: a system unit; 911: a CPU; 912: a bus; 913: a ROM; 914: a RAM; 915: a communication board; 920: a magnetic disk drive; 921: an OS; 922: a window system; 923: programs; 924: files; 931: a telephone; 932: a facsimile machine; 940: the Internet; 941: a gateway; and 942: a LAN.

The invention claimed is:

1. An information filtering system comprising:
a first filter unit inputting document data belonging to at least any kind among a plurality of kinds from an input equipment, carrying out a predetermined classifying process to specify a kind to which the document data inputted belongs using a CPU (Central Processing Unit), and specifying the kind to which the document data inputted belongs as first classified information;

a second filter unit inputting the document data from an input equipment, carrying out a predetermined classifying process being different from the classifying process of the first filter unit using a CPU, specifying a kind to which the document data inputted belongs as second classified information;

a first correct answer comparing unit comparing the first classified information of a plurality of pieces of learning document data specified by the first filter unit with treating each of the plurality of pieces of learning document data which belongs to a kind previously specified as the document data and correct answer information of the plurality of pieces of learning document data which belongs to the kind previously specified using a CPU, generating first learning result information of the plurality of pieces of learning document data showing whether the first classified information matches the correct answer information or not based on comparison result, and storing the first learning result information generated of the plurality of pieces of learning document data in a memory equipment;

a second correct answer comparing unit comparing the second classified information of the plurality of pieces of learning document data specified by the second filter unit with treating each of the plurality of pieces of learning document data as the document data and the correct answer information of the plurality of pieces of learning document data using a CPU, generating second learning result information of the plurality of pieces of learning document data showing whether the second classified information matches the correct answer information based on comparison result, and storing the second learning result information generated of the plurality of pieces of learning document data in a memory equipment;

an error rate calculating unit calculating a first error rate showing a rate that the first classified information does not match the correct answer information based on the first learning result information of the plurality of pieces of learning document data generated by the first correct answer comparing unit using a CPU, and as well calculating a second error rate showing a rate that the second classified information does not match the correct answer information based on the second learning result information of the plurality of pieces of learning document data generated by the second correct answer comparing unit using a CPU; and a result outputting unit specifying a kind to which the classifying target document data belongs using a CPU based on the first classified information specified by the first filter unit with treating classifying target document data which is a target to be classified to a specific kind as the document data, the second classified information specified by the second filter unit with treating the classifying target document data as the document data, the first error rate calculated by the error rate calculating unit, and the second error rate calculated by the error rate calculating unit, and outputting the kind specified to an output equipment as a classified result.

2. The information filtering system of claim 1,
wherein the first filter unit is a learning filter unit including:
a learning unit inputting a plurality of sets of the learning document data and the correct answer information from an input equipment, carrying out a statistic process to generate statistic information being common to each learning document data belonging to each kind as learning data based on the plurality of sets using a CPU, and storing the learning data generated by the statistic process in a memory equipment; and a learning classifying unit inputting the classifying target document data from an input equipment, calculating a ratio of correspondence of the classifying target document data to the statistic information shown by the learning data generated by the learning unit for each kind as classification probability using a CPU, and specifying a kind to which the classifying target document data belongs based on the classification probability for each kind.

3. The information filtering system of claim 2,
wherein the learning unit carries out the statistic process using either one of a Bayesian theory, an SVM (Support Vector Machine), and a neural network model.

4. The information filtering system of claim 3,
wherein the second filter unit is a string matching filter unit inputting the document data from an input equipment, inputting matching condition information from a memory equipment which previously stores a classifying keyword belonging to each kind as the matching condition information, carrying out a string matching process using a CPU to discriminate whether the classifying keyword of each kind shown by the matching condition information is included in the document data or not, and specifying the kind, to which the classifying keyword which is discriminated to be included in the document data by the string matching process belongs, as the kind to which the document data belongs.

5. The information filtering system of claim 4,
wherein the string matching filter unit carries out the string matching process using a deterministic finite automaton.

6. The information filtering system of claim 5,
wherein the string matching filter unit carries out the string matching process using a state transition table of the deterministic finite automaton showing the classifying keyword as the matching condition information.

7. The information filtering system of claim 4,
wherein the string matching filter unit carries out the string matching process using a nondeterministic finite automaton.

8. The information filtering system of claim 4,
wherein the result outputting unit, when the first error rate is smaller than the second error rate, outputs the first classified information as the classified result, and when the second error rate is smaller than the first error rate, outputs the second classified information as the classified result.

9. The information filtering system of claim 4,
wherein the result outputting unit expresses the first classified information and the second classified information with predetermined numeral values, weights the first classified information according to the first error rate, as well weights the second classified information according to the second error rate, calculates an average value of the first classified information weighted and the second classified information weighted as a weighted average value, compares the weighted average value calculated and a predetermined threshold value, and outputs the classified result based on comparison result.

10. The information filtering system of claim 4,
wherein the matching condition information shows a specific classifying keyword among the plurality of classifying keywords as a specific keyword, and
wherein the result outputting unit outputs a kind to which the specific keyword belongs as the classified result of the classifying target document data which is discriminated to include the specific keyword by the string matching filter unit.

11. The information filtering system of claim 4,
wherein the error rate calculating unit calculates the first error rate based on the first learning result information generated within a predetermined period, and as well calculates the second error rate based on the second learning result information generated within the predetermined period.

12. The information filtering system of claim 2,
wherein the learning filter unit includes a first learning filter unit and a second learning filter unit,
wherein the first learning filter unit and the second learning filter unit respectively include the learning unit and the learning classifying unit,
wherein the learning unit of the first learning filter unit and the learning unit of the second learning filter unit respectively carry out different statistic processes, and
wherein the first classified information shows first learning classified information showing the kind specified by the learning classifying unit of the first learning filter unit and second learning classified information showing the kind specified by the learning classifying unit of the second learning filter unit.

13. The information filtering system of claim 12,
wherein the result outputting unit, when the first classified information is outputted as the classified result, obtains a logical sum of the kind shown by the first learning classified information and the kind shown by the second learning classified information, and outputs the kind shown by the logical sum obtained as the classified result.

14. The information filtering system of claim 12,
wherein the result outputting unit, when the first classified information is outputted as the classified result, outputs the classified result based on the classification probability of the kind shown by the first learning classified information and the classification probability of the kind shown by the second learning classified information.

15. The information filtering system of claim 12,
wherein the error rate calculating unit calculates an error rate of the first learning classified information and an error rate of the second learning classified information as the first error rate, and
wherein the result outputting unit, when the first classified information is outputted as the classified result, weights the first learning classified information according to the error rate of the first learning classified information, and as well weights the second learning classified information according to the error rate of the second learning classified information, calculates an average value of the first learning classified information weighted and the second learning classified information weighted as a weighted average value, compares the weighted average value calculated and a predetermined threshold value, and outputs the classified result based on comparison result.

16. The information filtering system of claim 2,
wherein the learning filter unit includes a plurality of sets of the learning unit and the learning classifying unit,
wherein a plurality of the learning units respectively carry out the statistic processes,
wherein the first classified information shows the kind specified by the learning classifying unit of the respective set, and
wherein the result outputting unit, when the first classified information is outputted as the classified result, outputs the kind specified by the largest number of sets as the classified result.

17. An information filtering method comprising:
by a first filter unit, performing a first filter process of inputting document data belonging to at least any kind among a plurality of kinds from an input equipment, carrying out a predetermined classifying process to specify a kind to which the document data inputted belongs using a CPU (Central Processing Unit), and specifying the kind to which the document data inputted belongs as first classified information;
by a second filter unit, performing a second filtering process of inputting the document data from the input equipment, carrying out a predetermined classifying process being different from the classifying process of the first filter unit using a CPU, specifying the kind to which the document data inputted belongs as second classified information;
by a first correct answer comparing unit, performing a first correct answer comparing process of treating each of a plurality of pieces of learning document data which belongs to a kind previously specified as the document data, comparing the first classified information of the plurality of pieces of learning document data specified by the first filter unit and correct answer information of the plurality of pieces of learning document data which belongs to the kind previously specified using a CPU, generating first learning result information of the plurality of pieces of learning document data showing whether the first classified information matches the correct answer information or not based on comparison result, and storing the first learning result information generated of the plurality of pieces of learning document data in a memory equipment;

by a second correct answer comparing unit, performing a second correct answer comparing process of treating each of the plurality of pieces of learning document data as the document data, comparing the second classified information of the plurality of pieces of learning document data specified by the second filter unit and the correct answer information of the plurality of pieces of learning document data using a CPU, generating second learning result information of the plurality of pieces of learning document data showing whether the second classified information matches the correct answer information based on the comparison result, and storing the second learning result information generated of the plurality of pieces of learning document data in the memory equipment;

by an error rate calculating unit, performing an error rate calculating process of calculating a first error rate showing a rate that the first classified information does not match the correct answer information based on the first learning result information of the plurality of pieces of learning document data generated by the first correct answer comparing unit using a CPU, and as well calculating a second error rate showing a rate that the second classified information does not match the correct answer information based on the second learning result information of the plurality of pieces of learning document data generated by the second correct answer comparing unit using a CPU; and by a result outputting unit, performing a result outputting process of treating classifying target document data which is a target to be classified to a specific kind as the document data, specifying the kind to which the classifying target document data belongs using a CPU based on the first classified information specified by the first filter unit, the second classified information specified by the second filter unit, the first error rate calculated by the error rate calculating unit, and the second error rate calculated by the error rate calculating unit, and outputting the kind specified to an output equipment as a classified result.

18. The information filtering system of claim 2, wherein the second filter is a filter different from the first filter.

19. A non-transitory computer readable medium storing an information filtering program including instructions which cause a computer to execute the information filtering method of claim 17.

20. The information filtering method of claim 17, wherein the second filter is a filter different from the first filter.

* * * * *